(12) United States Patent
Easterbrook et al.

(10) Patent No.: US 7,131,310 B2
(45) Date of Patent: *Nov. 7, 2006

(54) METHOD FOR MANUFACTURING IMPROVED FATIGUE LIFE STRUCTURES, AND STRUCTURES MADE VIA THE METHOD

(75) Inventors: Eric T. Easterbrook, Kent, WA (US); Nils Juhlin, Bothell, WA (US)

(73) Assignee: Stresswave, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/858,572

(22) Filed: Jun. 1, 2004

(65) Prior Publication Data

US 2005/0016245 A1  Jan. 27, 2005

Related U.S. Application Data

(62) Division of application No. 09/782,880, filed on Feb. 9, 2001, now Pat. No. 6,742,376.

(60) Provisional application No. 60/181,290, filed on Feb. 9, 2000.

(51) Int. Cl.
 *B21D 31/00* (2006.01)
(52) U.S. Cl. ............................. 72/334; 72/377
(58) Field of Classification Search .................. 72/334, 72/412, 377, 407
See application file for complete search history.

(56) References Cited

U.S. PATENT DOCUMENTS

| | | | |
|---|---|---|---|
| 2,377,558 A | 6/1945 | Johnson |
| 2,697,953 A | 12/1954 | Chapman |
| 2,810,191 A | 10/1957 | Hanna |
| 2,909,281 A | 10/1959 | Koskinen |
| 3,110,086 A | 11/1963 | Phillips |
| 3,270,410 A | 9/1966 | Salter et al. |
| 3,412,593 A | 11/1968 | Price |
| 3,434,327 A | 3/1969 | Speakman |
| 3,520,418 A | 7/1970 | Guinard |
| 3,551,015 A | 12/1970 | Whiteside |
| 3,646,791 A | 3/1972 | Leftheris |
| 3,673,833 A | 7/1972 | Cadwell |

(Continued)

FOREIGN PATENT DOCUMENTS

CA 2121120 5/1993

(Continued)

OTHER PUBLICATIONS

"Analysis of Stress and Deformation" Introduction To Contact Mechanics Elastic Indentation Stress Fields, Chapter 5, pp. 116-117.(Not Prior Art Based on Date).

(Continued)

*Primary Examiner*—Daniel C. Crane
(74) *Attorney, Agent, or Firm*—R. Reams Goodloe, Jr.

(57) ABSTRACT

A method for cold working metal structures. A compound indenter is used to produce deformation in a workpiece, to provide a selected beneficial residual stress profile, to provide improved fatigue life structures with minimal manufacturing steps. A compound indenter deforms a workpiece, resulting in dimples therein. A relatively uniform beneficial residual stress profile is provided at the surface and at the midplane of apertures in a workpiece, so as to improve overall fatigue life. A compound indenter tool having a first, elongate indenter with a shaped indenter surface portion, and a second shaped indenter surrounding the first indenter and forming an annular shoulder recessed from the surface portion of the first indenter, is used. Optionally, a foot having a bottom portion is used to confiningly surround an indenter during application of deforming force to the surface of a workpiece, to prevent deformation of adjacent workpiece surface.

51 Claims, 12 Drawing Sheets

U.S. PATENT DOCUMENTS

| | | |
|---|---|---|
| 3,796,086 A | 3/1974 | Phillips |
| 3,803,898 A | 4/1974 | Speakman |
| 3,824,824 A | 7/1974 | Leftheris |
| 3,895,922 A | 7/1975 | Phillips |
| 3,945,109 A | 3/1976 | Leftheris |
| 4,034,585 A | 7/1977 | Straub |
| 4,091,260 A | 5/1978 | Leftheris |
| 4,129,028 A | 12/1978 | Leftheris |
| 4,245,921 A | 1/1981 | Falcioni |
| 4,248,075 A | 2/1981 | Whitley |
| 4,417,463 A | 11/1983 | Nelson |
| 4,423,619 A | 1/1984 | Champoux |
| 4,493,141 A | 1/1985 | Krezak |
| 4,711,115 A | 12/1987 | Sukonnik |
| 4,771,627 A | 9/1988 | Speakman |
| 4,836,705 A | 6/1989 | La Barge |
| 4,862,043 A | 8/1989 | Zieve |
| 4,885,829 A | 12/1989 | Landy |
| 4,918,970 A | 4/1990 | Ishinaga |
| 4,934,170 A | 6/1990 | Easterbrook et al. |
| 5,059,059 A | 10/1991 | Cox |
| 5,146,668 A | 9/1992 | Gulistan |
| 5,398,537 A | 3/1995 | Michalewski et al. |
| 5,746,085 A | 5/1998 | Harada |
| 5,755,133 A | 5/1998 | Hirai |
| 5,771,729 A | 6/1998 | Bailey et al. |
| 5,816,093 A | 10/1998 | Takeuchi et al. |
| 5,841,033 A | 11/1998 | Burris et al. |
| 5,943,897 A | 8/1999 | Tsue et al. |

FOREIGN PATENT DOCUMENTS

| | | |
|---|---|---|
| DE | 390726 | 2/1924 |
| JP | 52-28087 | 3/1977 |
| JP | 60-216931 A | 10/1985 |
| JP | 2-151321 | 6/1990 |
| JP | 2-274414 | 11/1990 |
| JP | 4-138824 | 5/1992 |
| SU | 439330 | 8/1974 |
| SU | 1648619 A1 | 5/1991 |
| SU | 1808878 A1 | 5/1991 |

OTHER PUBLICATIONS

Theory of Elasticity, "The Propagation of Waves in Elastic Solid Media", S.P. Timoshenko and J.N. Goodier, Third Edition, Chapter 14, pp. 485-504.

"Plastic Waves and Shock Waves", H. Kolsky, Stress Waves in Solids, Chapter VII, pp. 163-182.

"Coining of Holes in Aluminum Plates: Finite Element Simulations and Experiments", Rutger Ogeman, Journal of Aircraft, vol. 29, No. 5, Sep.-Oct., 1992. pp. 947-952.

"Extending the Fatigue Life of Aircraft Engine Components by Hole Cold Expansion Technology", Antonio C. Rufin, ASME, presented at International Gas Turbine and Aeroengine Congress and Exposition, Cologne, Germany, Jun. 1-4, 1992. (9 pages).

"Fatigue Improvement by Sleeve Coldworking", Joseph L. Phillips, SAE, Inc., National Aerospace Engineering and Manufacturing Meeting, Los Angeles, California, Oct. 16-18, 1973. (13 pages).

"The Latest Technology in Hole Finishing: Ballizing", Sid Grodsky, Final Finish Technology, Spring, 1988, pp. 10-18.

"A Comparison of Two Manufacturers' Coldwork Tooling Systems: Does a Hole Recognize a Manufacturers' Part Number?", G. Rodman and M. Creager, West Coast Industries, (12 pages).

"Shear Crack Issues Addressed by Split Mandrel and Automated Coldworking", Matthew Weigel, Anthony Leon, SAE Aerofast 1996 Conference, Bellevue Washington, Oct. 1-3, 1996 (9 pages).

"Improvement of Fatigue Performance By Cold Hole Expansion. Part 1: Model of Fatigue Limit Improvement", V. Kliman, M. Bily and J. Prohacka, International Journal Fatigue, Mar. 1993, pp. 93-100.

"Improvement of Fatigue Performance By Cold Hole Expansion. Part 2: Experimental Verification of Proposed Model", V. Kilman, M. Bily and J. Prohacka, International Journal Fatigue, Mar. 1993, pp. 101-105.

"Automated Applications For The Split Mandrel Coldworking System", West Coast Industries, Fatigue Tech-Notes, Split Mandrel Automation 1093, (5 pages).

"The Effect of Interference on the Dimpled, Loaded-Hole Fatigue Strength of 2024-T3 Alclad® Aluminum Alloy", A.P. Kuc and J. Shewchuk, Journal of Testing and Evaluation, JTEVA, vol. 6, No. 3, May, 1978, pp. 157-166.

"Stress Corrosion Susceptibility of Stress-Coined Fastener Holes in Aircraft Structures", A.E. Carter and S. Hanagud, AIAA Journal, vol. 13, No. 7, pp. 858-863.

"Incorporating Hole Cold Expansion to Meet Durability and Damage Tolerance Airworthiness Objectives", L. Reid, Fatigue Technology Inc., #972624, (9 pages).

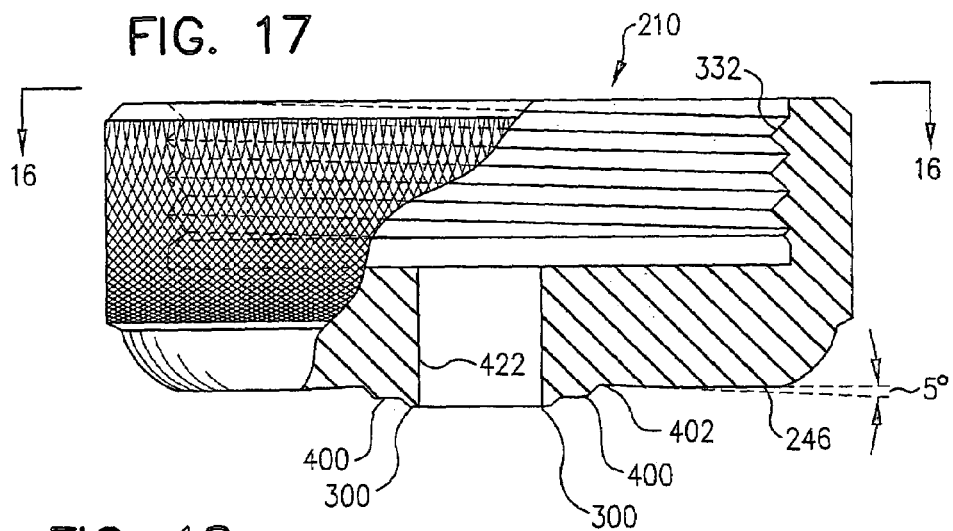
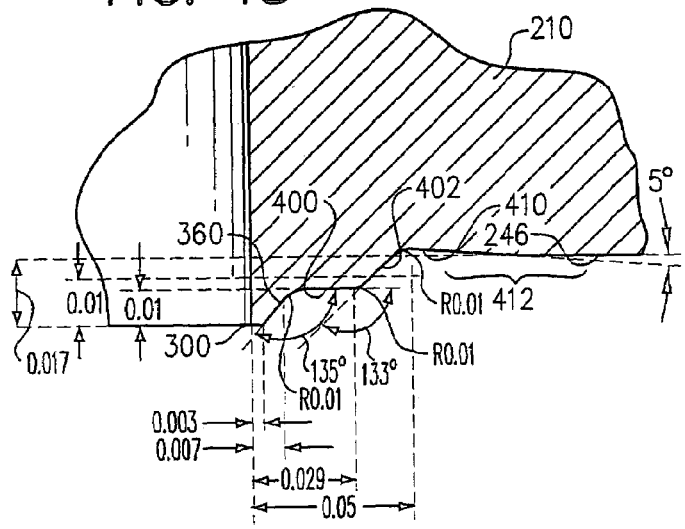
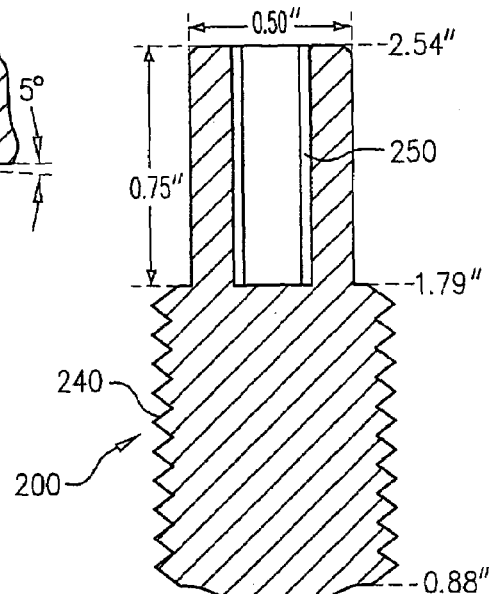
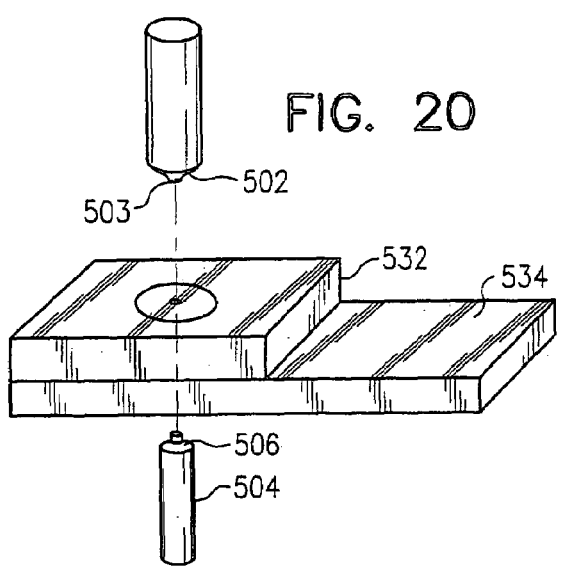
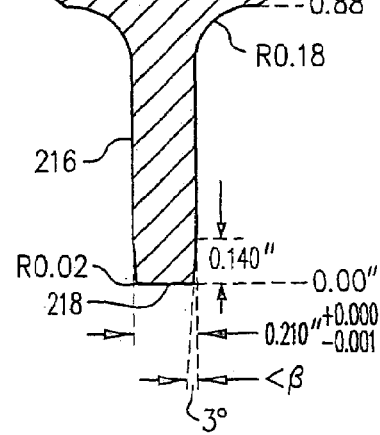

METHOD FOR MANUFACTURING IMPROVED FATIGUE LIFE STRUCTURES, AND STRUCTURES MADE VIA THE METHOD

RELATED PATENT APPLICATIONS

This patent application is a divisional of allowed U.S. application Ser. No. 09/782,880 filed Feb. 9, 2001, entitled "METHOD AND APPARATUS FOR MANUFACTURING STRUCTURES WITH IMPROVED FATIGUE LIFE", issued as U.S. Pat. No. 6,742,376 on Jun. 1, 2004, which claimed priority under 35 U.S.C. §119(e) from U.S. Provisional Application Ser. No.: 60/181,290, filed on Feb. 9, 2000, the disclosure of each of which is incorporated herein by their entirety by this reference.

COPYRIGHT RIGHTS IN THE DRAWING

A portion of the disclosure of this patent document contains material that is subject to copyright protection. The inventor has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention is related to novel methods for the manufacture of fatigue prone structures, and their components, and particularly metal parts having apertures therein, including, but not limited to, apertures utilized (a) for accommodating connecting elements, such as rivets, bolts, pins, screws or other fasteners, or (b) for accommodating tubing, cable, wires, rods, or other actuators, (c) for weight reduction purposes. Additionally it can be applied to guns, pressure vessels or other structures carrying pressurized fluid loads. Individual components, sub-structures, and overall finished structures can be manufactured utilizing the method and apparatus disclosed herein in order to achieve improved resistance to metal fatigue, and thus to have improved structural integrity.

BACKGROUND

Metal fatigue is a problem common to just about any component or structure that experiences cyclic stresses or repetitive loading. Such problems are especially important in the metal structures utilized in various components of transportation systems as they experience a varying amount of repetitive loads during normal operation. Structures or components that are prone to fatigue damage include, but are not limited to, commercial and private transport aircraft, general aviation, military aircraft, helicopters, jet engines, turbines, passenger cars, trucks, off-road equipment, construction vehicles, heavy construction equipment, boats, ships, trains, rolling stock, railroad track, stationary and moving bridges, medical implants, pressurized pipes and vessels, guns, cannons and the like.

Metal fatigue can generally be defined as the progressive damage, usually evidenced in the form of cracks, that occurs to structures as a result of cyclic or repetitive loading. The lower surface of an aircraft wing is a classical example of the type of loading that produces fatigue. The wing is subjected to various cyclic stresses resulting from gust, maneuvering, taxi and take-off loads, etc., which over the service life of the aircraft can produce fatigue damage.

Fatigue damage is generally observed, at time of initiation, in the form of growth of small cracks from areas of highly concentrated stress. Typical stress concentrators include holes, fillet radii, abrupt changes in section, notches, and the like. Fatigue damage can often be hidden to the untrained because it generally occurs under loads that do not generally cause yielding or deformation of the structure. In fact, failure usually occurs under loads typically experienced in the operation of the structure. Undetected, a fatigue crack can grow until it reaches a critical and catastrophic size or length. At the critical length, the unstable crack races through the metal, causing sudden failure of the component. Catastrophic failure of the entire structure, such as a wing or fuselage, can occur when other members of the structure can not carry the additional load from the failed member.

Even stationary objects such as railroad track, pressurized vessels and artillery equipment may fail in fatigue because of cyclic stresses. Cyclic loads caused by repeated loading due to rail car wheels running over an unsupported span of railroad track are the cause of many track failures. In fact, some of the earliest examples of fatigue failures were in the railroad and bridge building industry. Sudden pressure vessel failures can also be caused by repeated pressurization cycles acting on initially small cracks. It is not surprising that U.S. governmental studies report that fatigue damage is a significant economic factor in the U.S. economy.

While many methods have been developed and utilized for the manufacture of structures having improved fatigue life at fasteners, it would nevertheless still be desirable to reduce the amount of handling involved in producing such structures. That is because such a development would facilitate reduced manufacturing costs of enhanced fatigue life structures, thus reducing the cost of end products utilizing such structures, and/or enabling more widespread use of improved fatigue life components in industrial applications.

SUMMARY

An novel tool for working a structure to improve the fatigue strength at a selected location in the structure has been developed. Specifically, the tooling involves the provision of a compound indenter, of either a solid one-piece integral construction, or of adjustable multi-part construction, which includes a primary indenter with a contacting end for engagement with and deformation of a pre-selected portion of a first surface of the structure being worked, to impart a desirable residual stress profile in said body of the structure. The primary indenter has a first shaped surface with a preselected profile designed to impart the desired stress profile, and a sloping peripheral wall to facilitate removal of the indenter from the workpiece. The compound indenter, whether of the solid, integral one-piece design or of the adjustable design, also includes a secondary indenter having a second shaped surface having a preselected surface profile. The primary indenter and the secondary indenter are configured for engagement with the structure being worked. For the creation of the usual round holes in a workpiece (such as for rivets or other fasteners), the primary indenter and the secondary indenter are arranged concentrically on the working end of the compound indenter. In this manner, the secondary indenter is preferably situated, longitudinally, so as to form an annular shoulder having an inner ring edge around the primary indenter. In some cases, a very narrow, annular secondary indenter is followed by, radially outwardly, a sloping blend radius, and then a tertiary indenter surface. Next, another blend radius is located radially outward of the tertiary indenter surface. Ideally, a concave foot portion is located radially outward from the final indenter (as described, the tertiary indenter), and finally, a flat foot portion extends radially outward in the same plane as the top surface of the work piece being indented. When a circular hole is being formed, and a circular indenter is being utilized, the foot is annular in shape and confiningly structurally surrounds the outermost (normally secondary or tertiary indenter) to protect said first surface of the structure being worked against surface upset when the compound indenter acts on the first surface of the structure.

Importantly, in thick stacks of workpieces, a second compound indenter, of similar construction to that just described for the first compound indenter, can be utilized in the same fashion against a second side of the lowermost workpiece. In this fashion, desirable residual compressive stresses can be created at a preselected location throughout the body of each workpiece in the thick stack.

Use of the novel tooling described herein enables the practice of an improved method for the manufacture of a joint that includes overlapping at least first and second structural members. The method involves contacting a preselected portion of the first structural member with a first compound indenter at a pressure greater than the yield point of the composition of the structural member to deform a portion of the first structural member in a manner so as to impart a pre-selected residual stress at a location at or near a selected location for a first fastener aperture through the first structural member. Preferably, the indenter shape and the amount of indentation are selected in order to impart a residual compressive force that is substantially uniform along the entire length through the body of the first structural members along sidewall portions of a first fastener aperture. A second structural member is provided which has therein, or at least a location for manufacture therein, a second fastener aperture defined by a second sidewall portion. The second structural member can be either unworked with respect to improved fatigue resistance, or separately worked, or simultaneously worked by utilizing opposing compound indenters. Then, the apertures for holes in the first and second structural members are machined by reaming, to define, by their respective sidewall portions, the first fastener aperture in the first structural member, and the second fastener aperture in the second structural member. To finish the joint, a fastener is inserted through the common hole created by alignment of the first and second fastener apertures, and then the fastener is secured.

This improved method can also be advantageously utilized by employing dynamic compound indenter to impinge the surface of a metal workpiece, preferably in a direction normal to the surface. The action of the dynamic compound indenter causes waves of elastic and plastic stress to develop and propagate through the metal. Where appropriate, a platen or stationary indenter can be utilized to support a workpiece. In any event, properly applied and focused plastic stress waves impart a large zone of residual stress, readying the impact area for fabrication of a fastener hole. A drill, reamer, or other cutting device is positioned concentric to the impact zone from a circular compound indenter. When the hole is machined, a small rebound of the stresses surrounding the hole occurs. Such rebound manifests itself as shrinking of the manufactured hole. For this reason, the cutting tools used in this method may require the use of a feature, i.e., back-taper, that takes into account the inward metal movement in a hole. Otherwise, possible binding of the cutting tool might lead to reduced cutting tool life or to pore hole finish. Significantly, however, the desirable inward compressive stress are present at the edge of the manufactured hole to counteract potentially damaging stresses focused at the aperture edge.

Importantly, the tooling provided herein is uniquely adapted to high speed automation of the manufacture of holes and the joining of parts, particularly with rivets and other fasteners. Consequently, the simplified embodiments depicted herein should be considered exemplary, and not restrictive, as those of ordinary skill in the art and to whom this disclosure is directed will, having reviewed this disclosure, be able to directly adapt the tooling and the method disclosed to larger, more complex structures for manufacture of many important structures, such as aircraft components.

OBJECTS, ADVANTAGES AND NOVEL FEATURES

The herein described manufacturing process for producing enhanced fatigue life parts and structures can be advantageously applied to apertures for fasteners, to large holes, to non-round cutouts of a workpiece, to other structural configurations with thick material or to stackups of thinner material that make up a thick stack of materials. Treating a workpiece structure for fatigue life improvement, prior to fabricating the aperture itself, has significant technical and cost advantages. The method is simple, is easily applied to robotic and automated manufacturing methods, and is otherwise superior to those manufacturing methods heretofore used or proposed.

From the foregoing, it will be apparent to the reader that one important and primary object of the present invention resides in the use of a novel method for treating a workpiece to reduce fatigue stress degradation of the part while in service. The method reduces manufacturing costs, and both simplifies and improves quality control in the manufacture of parts with enhanced fatigue life.

Other important but more specific objects of the invention reside in the provision of an improved manufacturing process and of improved manufactured products with enhanced service life when subject to fatigue stress, as described herein, which:

Eliminates the requirement for mandrels;

Eliminates the requirement for split sleeves;

Eliminates the need for disposable split sleeves;

Minimizes or eliminates the need for lubrication and subsequent clean-up during manufacture of apertures for fasteners and other objects:

Allows for cold working of multi-component structures that have a bonding compound or wet sealant between adjacent metallic components;

Enables the production of a wide range of aperture diameters, in which a wide range of diameters are employed, in a single manufacturing step, rather than with different mandrel for each small increment in aperture size;

Allows the magnitude and depth of the residual stress to be carefully controlled, by control of the amount of force or energy input into the part or structure the indenters, or by control of dimple depth or other measure of displacement or indentation;

Enables process control to be established using feedback in the manufacturing system, enhancing quality assurance;

Eliminates shear tears in the workpiece, as commonly encountered in mandrel manufacturing methods;

Significantly reduces or effectively eliminates surface marring and upset associated with mandrel methods, thus significantly increasing fatigue life;

Is readily adaptable to automated manufacturing equipment, since manufacturing cycle times are roughly equivalent to, or less than, cycle times for automated riveting operations;

Enables aperture creation after fatigue treatment, by a single reaming operation, rather than with two reaming operations as has been commonly practiced heretofore;

Is low enough in cost that it can be effectively applied to other critical structures, such as fuselage structures, which are typically not treated because of cost;

Is effective at treating deep stackups of material, including multiple layers;

Is effective at treating thick structure where the comparative thickness of the stack elements differ greatly, i.e., one thick and one thin;

Is effective at treating a wide range of alloys.

Other important objects, features and additional advantages of my invention will become apparent to the reader from the forgoing and from the appended claims and the ensuing detailed description, as the discussion below proceeds in conjunction with examination of the accompanying drawing.

BRIEF DESCRIPTION OF THE DRAWING

The invention may be more readily understood and appreciated by a thorough review of the enclosed drawing, which includes the following figures:

FIG. 17 is a partially broken away side view of a nose cap with integral secondary indenter.

FIG. 18 is a close-up partial cross-sectional view of the nose cap just illustrated in FIG. 17, now showing details of the nose cap, which details appear, radially outward, as an integral secondary indenter, a first blended radius, an integral tertiary indenter, a second blended radius, a concave foot portion, and a flat foot portion.

FIG. 19 is a cross-sectional view of the adjustable primary indenter as illustrated in FIGS. 14 and 15, now showing external threads used for driving the adjustable primary indenter up and down in the primary indenter housing.

FIG. 20 illustrates the use of opposing, integral, one-piece compound indenters on a thick stack, to create desirable residual stresses in both the first side of an upper workpiece and in the second side of a lower workpiece, so that desirable compressive stress is created throughout the thick stack.

In the various figures, like structures will be noted with like reference numerals or letters, without further mention thereof.

DESCRIPTION

A novel indenter has been developed for cold working treatment of metallic structures, and most advantageously, relatively thick structures, or "deep stacks" of metallic structure. This indenter is thus advantageously utilized in the manufacture of various fatigue life enhanced structures. For the purposes of this disclosure, a thick structure or deep stack is considered to be a material having an overall thickness T that is about two times the diameter D of the hole that passes through the material, or greater (i.e., $T \geq 2D$)

Importantly, the indenter shape disclosed herein can be used on automated manufacturing equipment, including fastener installation devices, and other devices that span a continuum of strain ranges. These include process applications in the creep range (quasi-static) for treating strain sensitive materials, and high speed (dynamic impact) for treating material with low strain rate sensitivity or those benefiting from the higher rate.

Figure 1:
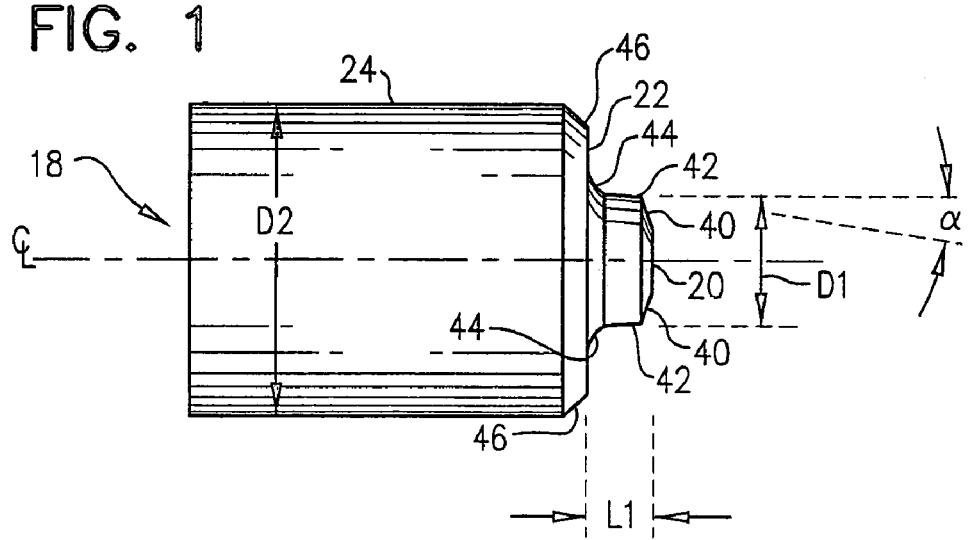
FIG. 1 shows a side view of a solid, integral, one-piece, compound indenter that has, in a radially outward direction from the centerline, a small, distal, primary indenter, a lead taper adjacent thereto, a sloping peripheral wall radially outward, a second blend radius, a secondary indenter, and a third blend radius to reach the outside diameter of the compound indenter.
Figure 2:
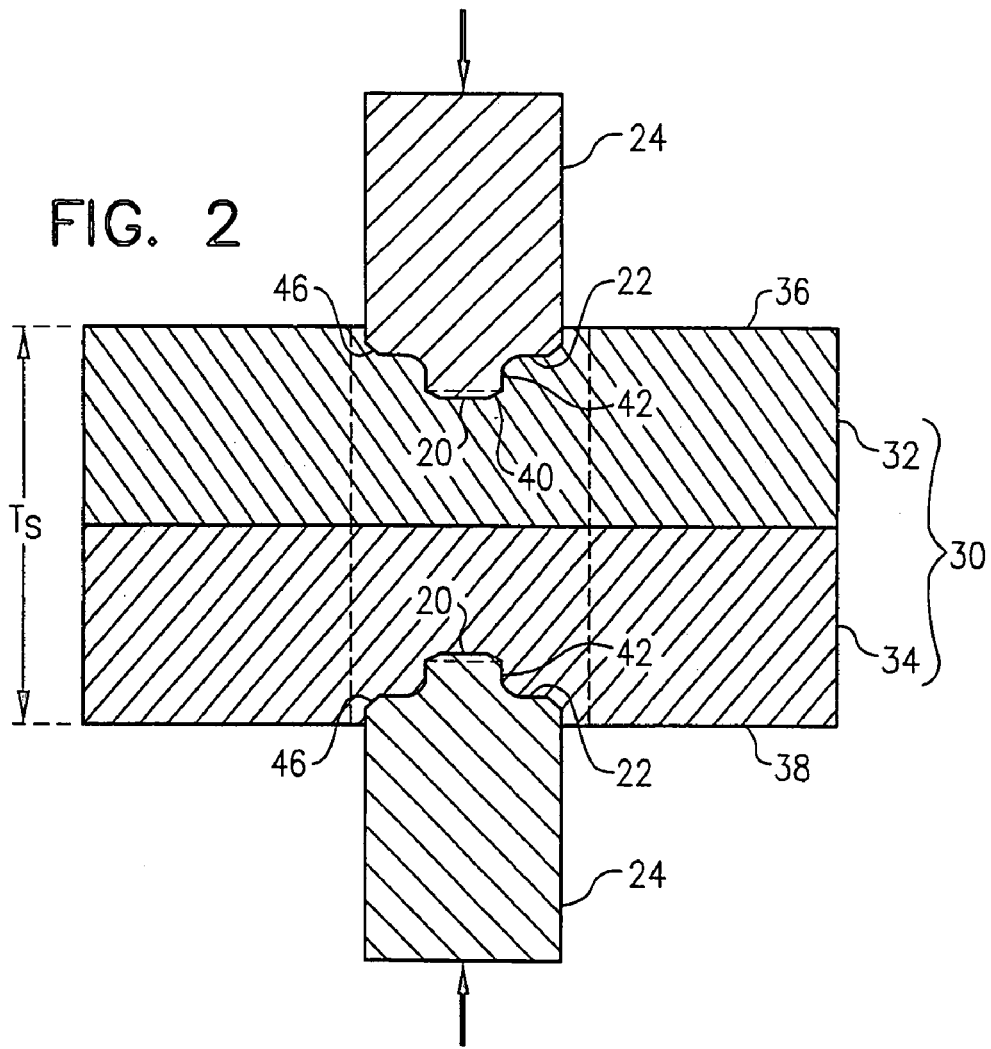
FIG. 2 illustrates the use of two compound indenters, each of the type just illustrated in FIG. 1, now showing the use of opposing compound indenters against top and bottom members of a thick stack of material.

As is illustrated in FIG. 1, a unique indenter 18 is provided with an end shape that is characterized by compound shape on the working end. Specifically, a first indenter 20 of overall diameter D1, also called the small or primary indenter, is located at the leading edge of a second indenter 22 of overall diameter D2, also called the large or secondary indenter, both of which are formed, if integrally, on an indenter shaft 24. Normally, both the first indenter 20 and the second indenter 22 are smaller than the selected fastener hole diameter. The primary indenter 20 allows for great indentation depth, resulting in desirable residual stresses at the interior of a deep stack, for example, a deep stack 30 of elements 32 and 34, as seen in FIG. 2.

The secondary indenter 22 imparts a high level of residual stress at or near the surface 36 of element 32, and, if used, at or near surface 38 of element 34. The length L1 of the primary indenter 20 is governed by the amount of indentation desired which in turn is governed by the overall thickness (and specific material) of stack 30. The indenter 18 is designed such that the secondary indenter 22 engages the stack surface(s) 36 or 38 at a point where the action of the primary indenter 20 begins to impart residual tensile stress at the surface 36 or 38. When the secondary indenter 22 makes contact with the surface 36 or 28 of the workpiece 32 or 24, it begins to reverse the tensile stress developed by the action of the primary indenter 20 by imparting compressive stresses. In comparison, should be noted that a prior art single feature indenter, such as a flat bottom punch, a tapered punch, or a spherical nose punch, instead imparts a deleterious residual tensile stress at the surface, and adjacent to the hole, when used to treat a deep stack of structural material. However, as illustrated using the compound indenter design disclosed herein, the primary 20 and secondary 22 indenter diameters work together to impart advantageous residual compressive stress, preferably substantially uniformly through the entire thickness $T_s$ of the deep stack 30. It should be understood that a plurality of indenter "steps" may be used depending on the stack thickness, i.e., there may be more than two. Thus, a compound indenter 18 should be understood to include N steps, where N is a positive integer of 2 or greater.

The working face edge of the primary indenter may feature a chamfer, or small lead in taper or blend radius 40 to give it both a measure of sharpness for ease of penetration and edge relief for resisting wear. The primary indenter 20 may also feature a slight taper portion 42, preferably having an angle alpha (α) of about 3° more or less, to improve radial flow of the metal being impacted, and to facilitate removal of the indenter 18 from a workpiece after processing. This is important because it might be expected that a straight shanked primary indenter would tend to bind in any resultant dimple in a workpiece, making removal of such an indenter from a workpiece difficult after processing.

The primary indenter 20 transitions (working right to left in FIG. 1) to the secondary indenter 22 diameter D2 through the aforementioned blend radius 40 and then the taper 42, and thence into a blend radius 44, and subsequently into secondary indenter working face 22. The working face of secondary indenter 22 is followed by an external blend radius 46.

The deep stack indenter illustrated in FIG. 1 is shown ready for the processing of a single side of a work piece or of a stack of workpieces, such as stack 32 shown in FIG. 2. However, in FIG. 2, an additional element is introduced, in that a typical two-sided treatment of a two element stack 30 is shown. An indenter 24 as described in the embodiment set forth above may be advantageously provided in a fixed geometry, in the sense that the length L1 of the primary indenter 20 is machined into the indenter 18, i.e., it is an integral, one-piece, solid indenter.

Figure 3:
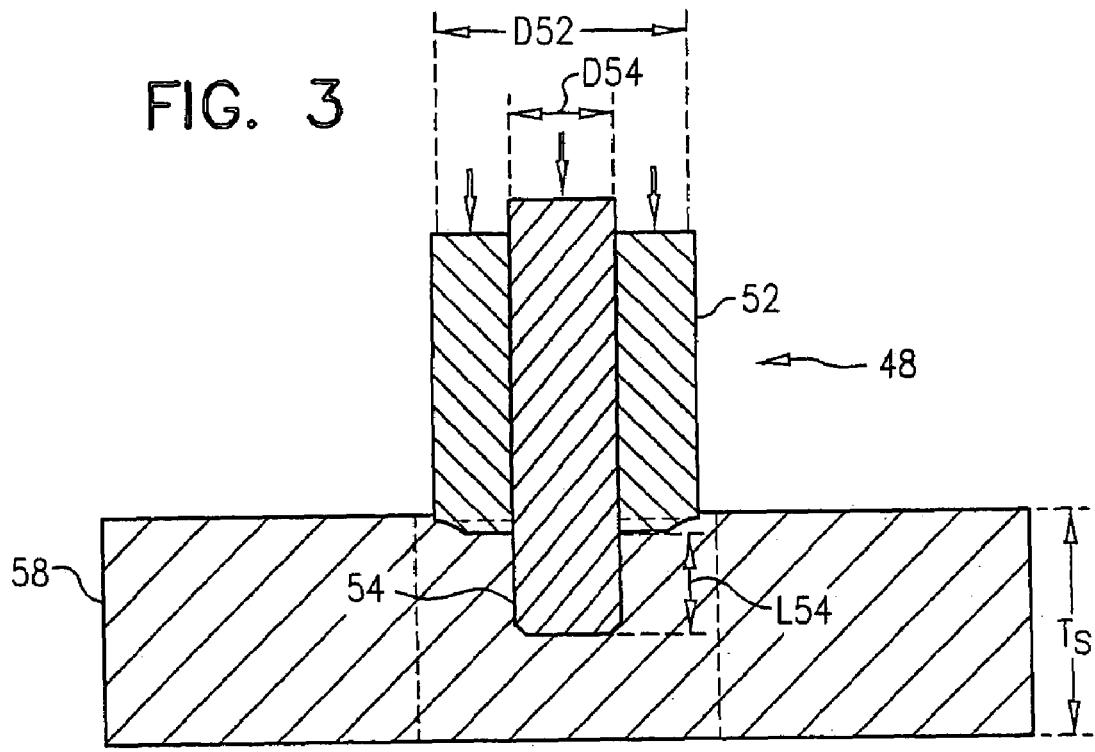
FIG. 3 illustrates a compound indenter having a primary indenter with a working length which is adjustable with respect to the face level of a secondary indenter.

Another embodiment for a desirable indenter is improved indenter 48, seen in FIG. 3. The indenter 48 preferably includes a hollow secondary indenter 52 of outside diameter D52 surrounding a solid primary indenter 54 of outside diameter D54. As illustrated, the primary and secondary indenter can be considered both cylindrical, however, certain applications (non-circular cutouts, for example) lend themselves to being worked by non-cylindrical or odd shaped compound indenters. Importantly, the working length L54 of the primary indenter can be adjusted, depending on the desired depth of material treatment, the stack thickness $T_s$, and on the composition of material 58. In this way the primary 54 and secondary 52 indenters can be positioned independently. If provided in cylindrical fashion, the composite shape of indenter 48 is similar, overall, to the solid-piece, deep stack indenter 18 described above. Moreover, it should be noted that use of multiple indenters (for example a two-indenter design using a primary and secondary indenter) may provide as advantageous results as shown herein, if such multiple indentations are provided as separate, sequential tooling operations (in the example noted, with the primary indenter tool operation preceding a secondary indenter tool operation).

Figure 4:
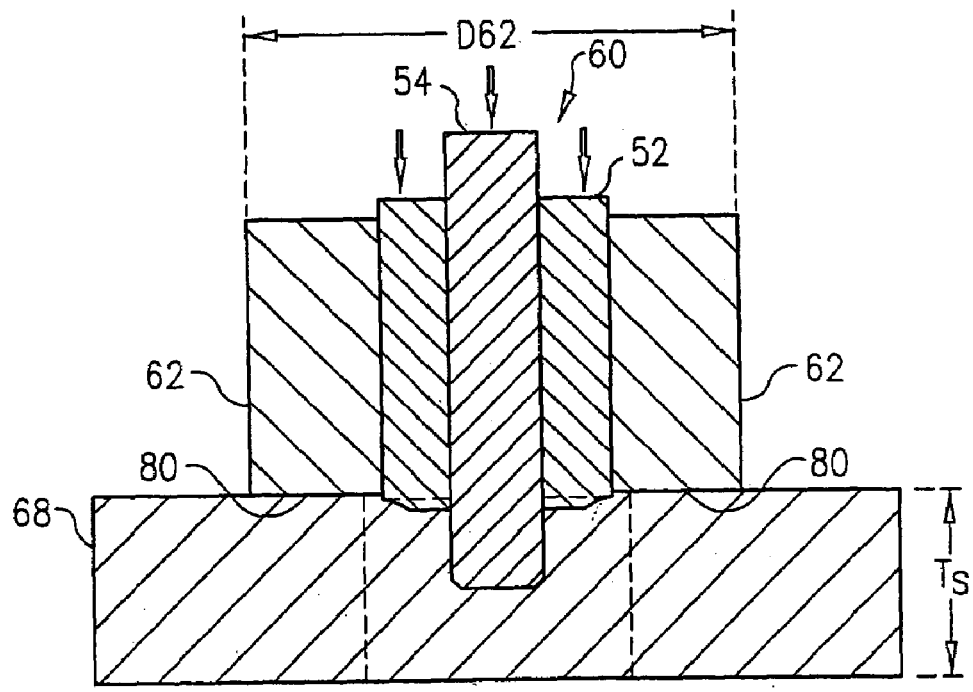
FIG. 4 illustrates the use of a compound indenter as just illustrated in FIG. 3 above, but now also including a foot or stop confiningly surrounding the secondary indenter, where the stop minimizes surface upset in the structural workpiece.
Figure 5:
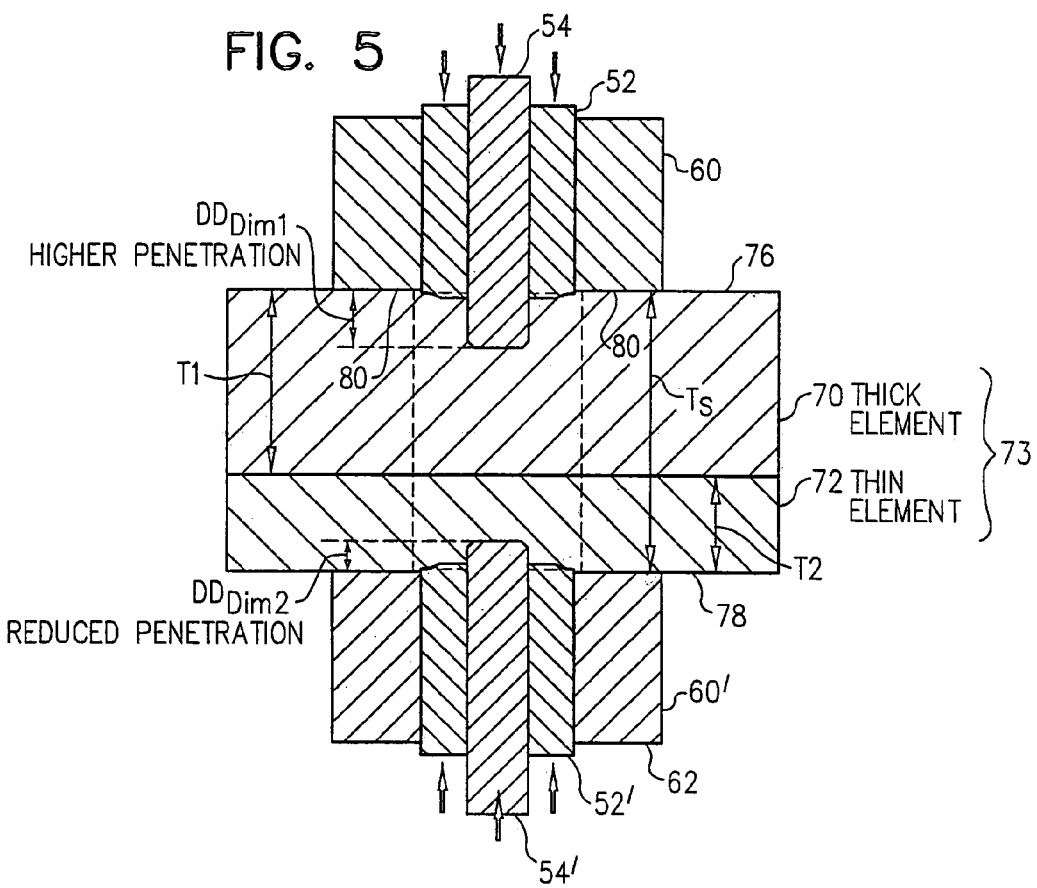
FIG. 5 illustrates the use of first and second compound indenters, each of the type shown in FIG. 5, with an adjustable first primary indenter adjusted to a different penetration depth than a second primary indenter, and with the first and second compound indenters acting on opposing sides of a thick workpiece.

Turning now to FIG. 4, a further variation of my indenter design is provided by deep-stack indenter 60. Indenter 60 uses yet another hollow device (preferably, but not necessarily, in concentric cylindrical fashion) for a foot or stop 62 of outside dimension D62 that facilitates the manufacture of differing dimple depths in material 68. Such features may be advantageously employed in the case of processing of unbalanced deep stacks as shown in FIG. 5. In this instance, "balance" refers to the relative thickness T1 of first stack material element 70 and compared to the thickness T2 of the second stack material element 72. As an example, a perfectly balanced stack would have two members 70 and 72 of the same thickness and material. In such a situation, the proportion of the stack elements is 50:50, and thus the dimple depth would be equal. For unbalanced stacks, as in the 30:70 for example illustrated in FIG. 5, it may be necessary to independently control the dimple depth $DD_{DIM1}$ of the dimple in first material 70 and the dimple depth $DD_{DIM2}$ of the dimple in the second material 72, i.e, vary the dimple depth in opposing sides. When using cylindrical indenters, a larger diameter hollow cylindrical member 60 provides a stop or "foot" for transferring load without indentation in surface 76 of first material 70 or in surface 78 of second material 72. The foot 60 also provides resistance to surface upset in the surfaces 76 and 78. Use of this unique tool, and this method of processing materials, allows complete freedom and independence in the selection of desired heights in primary, secondary, tertiary or more indenter portions N, and thus allows the depth of treatment in opposing materials in a stack to be dissimilar. Additionally, it should be noted that in some circumstances, it may be advantageous to provide, in an integral, one-piece combination, either (a) (1) the primary indenter, (2) the secondary indenter feature and (3) the foot, or (b) (1) the secondary indenter and (2) the foot.

In FIG. 5, it should be noted that treatment in an unbalanced stack 73 allows for less indentation, i.e., small dimple depth $DD_{DIM2}$ in the thinner material 72 of thickness T2. The lower primary indenter 54' and secondary indenter 52' penetration is thus desirably smaller, which is important since a high amount of penetration of a thin structural element could cause undesired deformation. Conversely, the upper material 70 requires greater penetration because of its greater thickness T1. Because greater load is required to make a deeper penetration than a light penetration, the foot or stop 60 is advantageous in carrying the larger load acting on the upper element 70. Without the foot 60, the indenters 52 and 54 might achieve equilibrium at undesirable dimple depths $DD_{DIM1}$. and or $DD_{DIM2}$. The cross sectional contact area of the foot 60 is desirably large enough so that at any anticipated processing load, no surface yielding on surface 76 would occur as a result of its contact of the bottom 80 of foot 60 with the surface 76 of material 70. Moreover, the foot is an important tool in automated manufacturing, where it also serves to secure a workpiece at a desired working location while the indenter acts on the workpiece.

It is a significant improvement in the art that the novel compound indenter shapes disclosed herein provide a unique and important advantage for treating thick sections or deep stack-ups of material. One example of data which illustrates the efficacy of the indenter designs shown herein, and of the methods of employing such indenters in improving fatigue life of materials, can be seen by comparison of FIG. 10 (which illustrates hoop stress profiles in materials worked according to the present invention) with the data in FIGS. 6 through FIG. 9 (which illustrate materials worked with a single shaped end indenter). The data illustrated in FIGS. 6 through 10 was developed by using a one-inch thick piece of 2000 series aluminum alloy as the workpiece. However, the data apply equally to two one-half inch pieces of 2024-T3 aluminum that are stacked on top of each other, where the back surface is the interface between the two pieces of aluminum. First, the stress profiles resulting from the actions of individual, single shaped end indenters, both before and after machining a hole in the structure, are shown in FIGS. 6 through FIG. 9. Then, in FIG. 10, the stress profile results from the action of a compound indenter of the type taught herein, wherein the number of indenter portions N=2 was utilized. The data generated in FIG. 10 results from cold working a material using a compound indenter with a primary indenter 20 diameter of 0.210 inches (5.33 mm) and a secondary indenter 22 diameter of 0.300 inches (7.62 mm), to provide sufficient cold working for a an adequate residual stress profile in the manufacture of a ⁵⁄₁₆-inch (0.3125 inch) (7.94 mm) diameter fastener hole.

Note that in FIGS. 6 through 9, the stress profiles result from only the action of a single indenter with a suitable end profile acting on the workpiece. Each of FIGS. 6 through 9 show only two primary regions, namely (a) the compressive stress region, and (b) and the tensile stress region. The dividing line between the compressive stress region and the tensile stress region is designated as "the zero stress profile" line and denoted as line "Z". It is that line "Z" which is indicated in each of FIGS. 6 through 9, for a series of dimple depths "dd". Since the benefit of cold working is derived from the size and shape of the compressively stressed region surrounding the hole, an examination of the dividing line between compressive stress and tensile stress greatly simplifies the comparison between the figures. Since the finite element analysis results which are presented in these FIGS. 6 through 10 are symmetrical from top to bottom, only one-half of the material stack thickness is shown in the FIGS. 6 through 10. What is referred to in the various figures as the "back surface" is really the mid-plane of an entire one-inch stack, or the interface of two one half-inch pieces. The "work surface" is the side that is acted on by the indenter, to create a dimple in the surface of the workpiece. The x-axis shows the radial distance from the center of a desired 5/16-inch (7.94 mm) hole which is to be, or has been, manufactured (depending on whether the applicable figure shows the stress profile before or after reaming). A line at the left of each FIGS. 6 through 10 is designated as the "hole radius", and the relationship of this location to the "zero stress profile" line shows the nature of the stresses as they appear at the hole wall, i.e., the radius of the hole.

Figure 6:
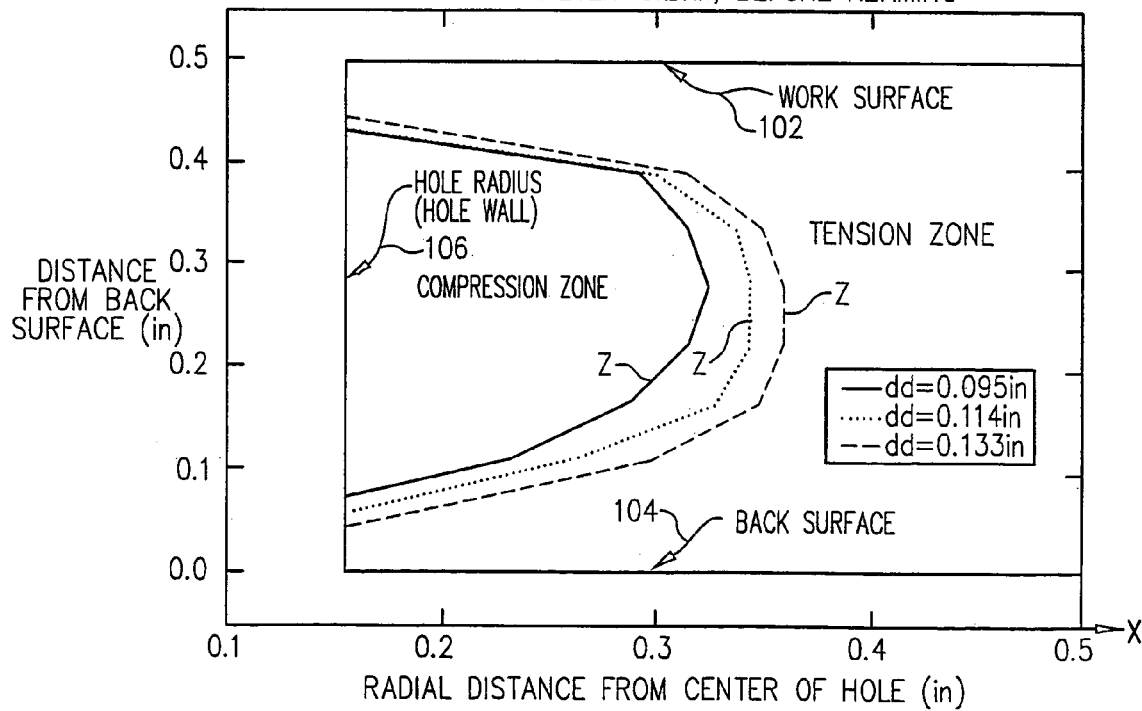
FIG. 6 illustrates the zero hoop stress profiles resulting from the action of a single, simple, prior art indenter of 0.210 inch (5.33 mm) diameter, with a suitable end profile acting against the work surface of a workpiece, before reaming to form the desired hole in the workpiece.

Further details seen in the various figures should be noted as follows:

FIG. 6 shows the extent of the compressive stress caused by an indenter diameter of 0.210 inches (5.33 mm). For purposes of this example, the dimple depths "dd" imparted into the workpiece are 0.095 inch (2.41 mm), 0.114 inches (2.90 mm), and 0.133 inches (3.38 mm), as shown by the various lines and depicted by separate legend in the figure. In this FIG. 6, the stresses plotted for comparison are those present after indentation of the workpiece, but before the hole is machined by reaming.

Figure 7:
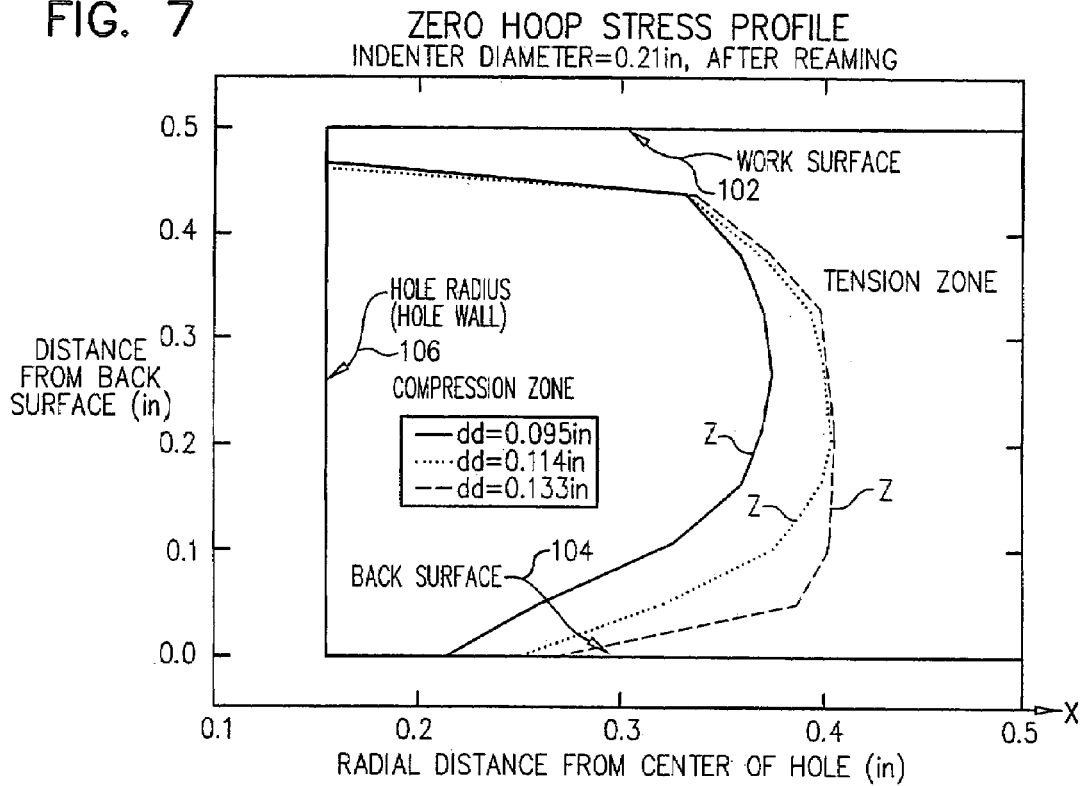
FIG. 7 illustrates the zero hoop stress profiles resulting from the action of a single, simple, prior art indenter of 0.210 inch (5.33 mm) diameter, with a suitable end profile acting against the work surface of a workpiece, after reaming to form the desired hole in the workpiece.

FIG. 7 shows the extent of the compressive stress caused in a workpiece by an indenter diameter of 0.210 inches (5.33 mm). Dimple depths in the workpiece are 0.095 inch (2.41 mm), 0.114 inches (2.90 mm), and 0.133 inches (3.38 mm), as shown by the various lines and depicted by separate legend in the figure. The stresses plotted for comparison are those present after (a) indentation, and (b), the hole has been machined by reaming. Note the extent of the compressive zone at the back surface, shown at the bottom of FIG. 7. It is larger, i.e, extends to through a larger radius from the center of the hole, than provided by a larger, 0.300 inch (7.62 mm) diameter indenter, as can be seen by comparison with FIG. 9. Also note that tension forms at the work surface for all dimple depths "dd". The presence of a tension area at the work surface is an undesirable condition which may be experienced when utilizing a single diameter indenter to act on thick materials or deep stack workpieces. Thus, this result shows why improved stress profile development when performing manufacturing operations on thick materials, i.e., deep stack workpieces, would be desirable. Such an improved indenter tool, and an optimized method of utilizing such a tool to provide an improved residual stress profile when processing a deep stack, is taught herein.

Figure 8:
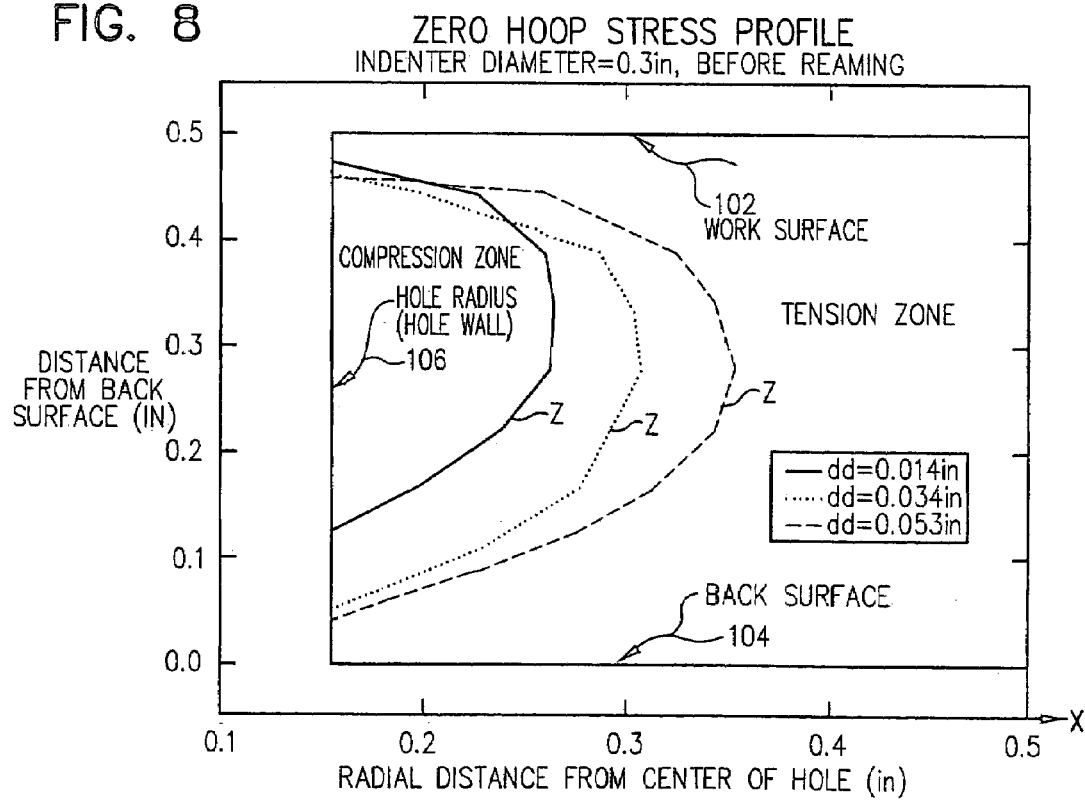
FIG. 8 illustrates the zero hoop stress profiles resulting from the action of a single, simple, prior art indenter of 0.300 inch (7.62 mm) diameter, with a suitable end profile acting against the work surface of a workpiece, before reaming to form the desired hole in the workpiece.

FIG. 8 illustrates the extent of the compressive stress caused by a single indenter having a diameter of 0.300 inches (7.62 mm) acting on a workpiece to produce a dimple of preselected depth. Stress profiles are indicated for dimple depths "dd" of 0.014 inch (0.36 mm), 0.034 inches (0.86 mm), and 0.053 inches (1.35 mm), as indicated by the various line patterns depicted by separate legend, as set forth in the illustration. Note that in this FIG. 8, the stress profile illustrated is after indentation of the workpiece, but before the hole is machined.

Figure 9:
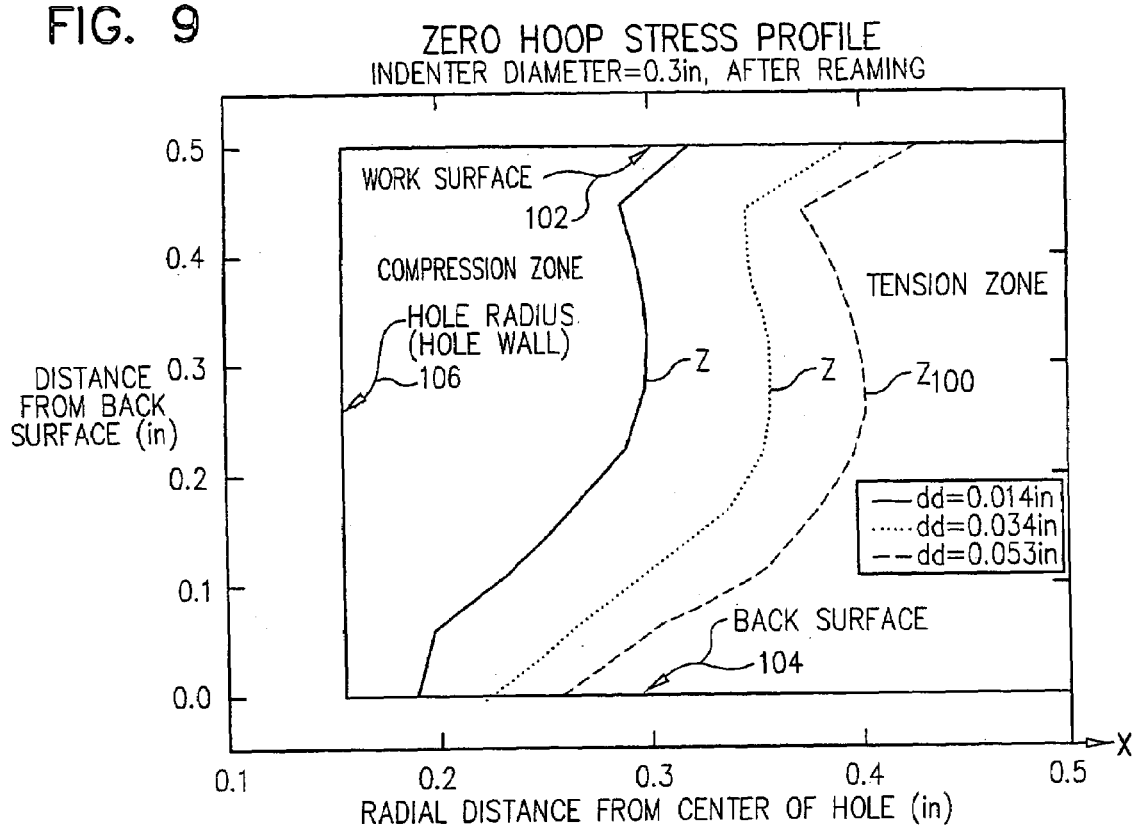
FIG. 9 illustrates the zero hoop stress profiles resulting from the action of a single, simple, prior art indenter of 0.300 inch (7.62 mm) diameter, with a suitable end profile acting against the work surface of a workpiece, after reaming to form the desired hole in the workpiece.

Next, FIG. 9 shows the extent of the compressive stress caused by an indenter of 0.300 inches (7.62 mm) diameter acting on a workpiece to produce a preselected dimple depth "dd". The illustrated dimple depths "dd" are 0.014 inch (0.36 mm), 0.034 inches (0.86 mm), and 0.053 inches (1.35 mm), as indicated by the various line patterns depicted by separate legend, as set forth in the illustration. In this FIG. 9, the stress profile shown is (a) after indentation of the workpiece to form a dimple, and (b) after the hole is machined. In particular, note the radial extent of the compressive zone at the work surface; utilizing the larger diameter indenter. The compressive zone is much larger than that imparted by utilization of the 0.210 inch (5.33 mm) indenter earlier illustrated. Importantly, desirable compressive stress is created at all dimple depths "dd". Also, note the reduced compressive stress at the back surface when compared to that generated by the 0.210 diameter (5.33 mm) indenter. This is an undesirable condition which results from the action of the prior art indenters on deep stacks.

Figure 10:
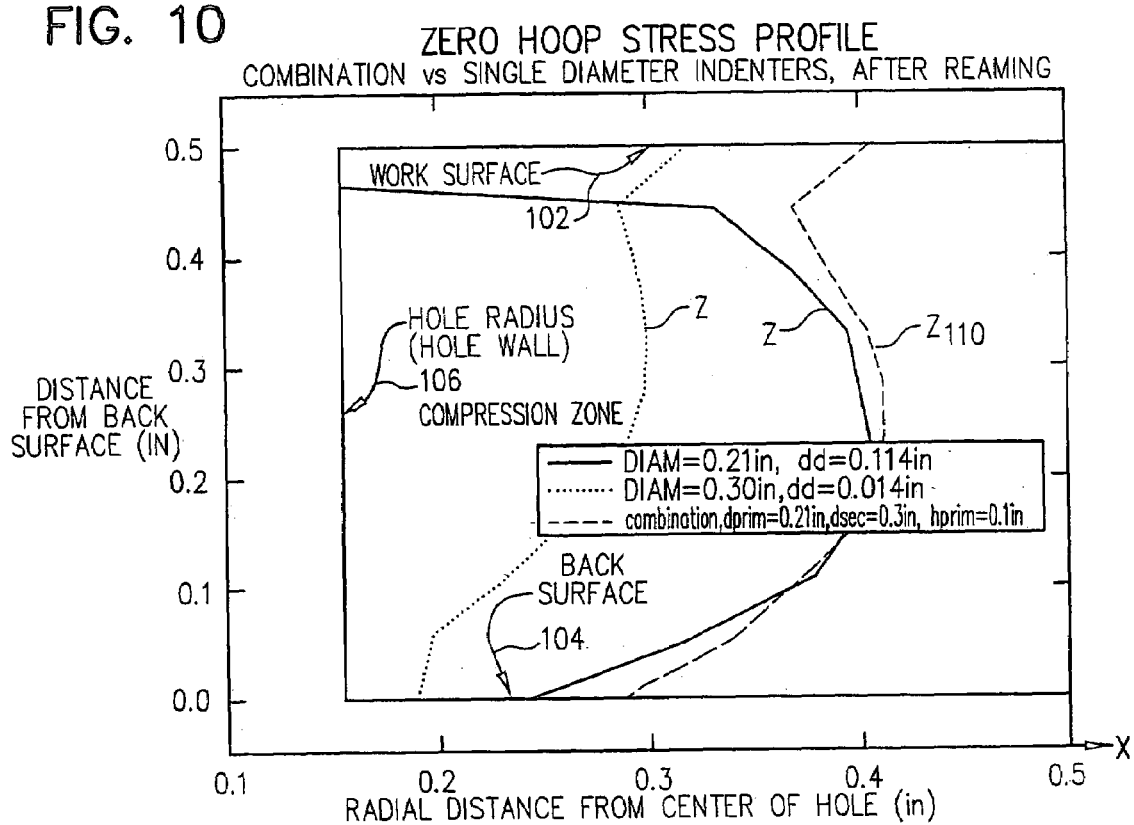
FIG. 10 illustrates the stress profiles resulting from (1) the action of a single, simple prior art indenter of 0.210 inch (5.33 mm) diameter, with a suitable end profile acting against the work surface of a workpiece, after reaming to form the desired hole in the workpiece, (2) the action of a single, simple prior art indenter of 0.300 inch (7.62 mm) diameter, with a suitable end profile that provides an optimum pressure profile against the work surface of a workpiece, after reaming to form the desired hole in the workpiece, and (3) a compound indenter of the type taught herein, having a primary indenter diameter of 0.210 inch (5.33 mm) and a secondary indenter diameter of 0.300 inch (7.62 mm) diameter, with the primary and secondary indenters each having a suitable end profile that provides an optimum pressure profile against the work surface of a workpiece, with the zero hoop stress profile shown after reaming to form the desired hole in the workpiece.

In order to create an optimized stress profile, we have developed a compound indenter tool, which can be utilized in obtaining an optimized residual stress profile in a thick workpiece or deep stack of material. The stress profile generated by action on a workpiece of our compound indenter, having a primary indenter 20 (designated "dprim" in the figure)diameter of 0.210 inches (5.33 mm), and secondary indenter 22 (designated "dsec" in the figure) diameter of 0.300 inches (7.62 mm), is shown in FIG. 10. The elements of FIG. 10 have been developed and are noted like the data set forth in FIGS. 6 through 9 above. Importantly, the action of the compound indenter incorporates the best effects of a single diameter indenter, without producing the undesirable effects of surface tension in a workpiece. As a result of using our new indenter shape, a large zone of compressive stress extends through the full depth of a thick workpiece material or deep stack components. FIG. 10 shows three lines, depicting (1) use of a simple, single indenter of 0.210 inches (5.33 mm) diameter to produce a dimple depth of 0.114 inches (2.90 mm) in a workpiece, (2) a simple, single indenter of 0.300 inches (7.62 mm) in diameter to produce a dimple depth of 0.014 inches (0.36 mm) in a workpiece, and (3) a compound indenter, with a primary indenter shape of 0.210 inches (5.33 mm) diameter, and a secondary indenter shape of 0.300 inches (7.62 mm) in diameter, to produce an overall dimple depth dd of 0.100 inches (2.54 mm) in a workpiece. The extent of the compressive stress generated by the compound indenter is greater at all areas of the workpiece when compared to either of the single diameter indenters when acting on a workpiece alone. As clearly illustrated in this FIG. 10, the use of a compound indenter for thick workpieces and deep stacks of materials is clearly an important advance in the art of manufacturing structures with improved fatigue life.

A close review of the information depicted in FIGS. 9 and 10 reveals one aspect of the improvement provided by the present invention. In FIG. 9, the zero hoop stress line $Z_{100}$ represents a maximal extent of residual stress which can be provided using a prior art single indenter of diameter 0.300 inches (7.62 mm). This line has vastly different residual stress performance at the work surface 102 as compared to the back surface 104. More precisely, the distance from the hole wall 106 of the compressive stress along the work surface 102 as compared to the distance of the compressive stress along the back surface 104 results in a uniformity ratio of 39.7% for this workpiece and indenter combination. In contrast, on an identical workpiece (1.00 inch (25.4 mm) thick 2024-T3 aluminum plate), by using the compound indenter as taught herein, the zero hoop stress line $Z_{110}$ shown in FIG. 10 shows that a uniformity ratio of 53.9% was achieved. This represents an improvement of 36% in the uniformity ratio resulting from cold working of the workpiece by use of or novel compound indenter.

We have found that use of dynamic indenters, while not absolutely necessary, can be employed in carrying out the process set forth herein. In conjunction with such efforts, it is sometimes advantageous to use an optimized profiled indenter with an uniform pressure profile, having a surface shape of the primary indenter of any compound indenter to be defined by the equation:

$$p_z = \frac{4(1-v^2)P_m a}{E} \int \left[\frac{1-r^2\sin^2\theta}{a^2}\right]^{1/2} d\theta$$

wherein
$p_z$=normal displacement of a selected surface location of said contacting end of said indenter above a flat reference plane;
v=Poisson's Ratio of the material comprising said structure;
E=Elastic Modulus of the material comprising said structure;
$P_m$=a pre-selected uniform pressure greater than the yield stress of the material comprising said structure;
a=radius of the contacting end of said indenter; and
θ, r=polar coordinates of a selected surface location on said contacting end of said indenter.

Regardless, this method is characterized by working a bounding portion of material in a structure, where the bounding portion is adjacent a pre-selected location for an opening in said structure, in order to provide residual compressive stresses in said bounding portion for improving the fatigue life of said structure. The method includes providing a first compound indenter having a first indenter surface portion, where the first indenter surface portion adapted to impact the structure at pre-selected surface locations adjacent said pre-selected location for the desired opening in the structure. A second indenter surface portion is provided, adapted to impact the structure at pre-selected surface locations adjacent the pre-selected location for the desired opening in said structure. The structure is indented by the primary and secondary indenters for a selected dimple depth. This provides beneficial residual stress in the structure toward the bounding portion of material of the structure.

Figure 11:
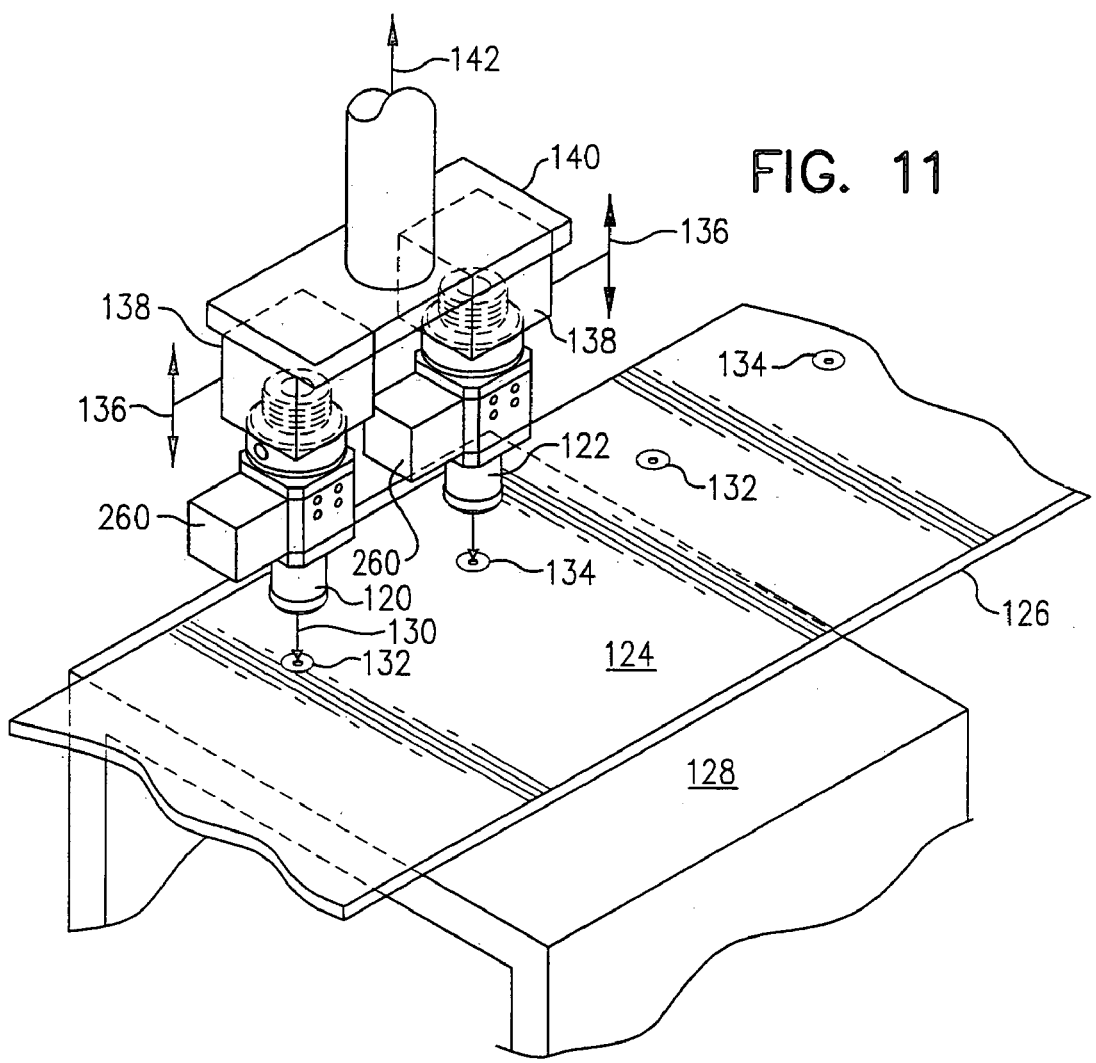
FIG. 11 shows the use of a pair of adjustable compound indenters as taught herein to indent the obverse side of a workpiece that is placed on a platen, so that the adjustable compound indenters can be actuated downward against the workpiece to provide suitable indentations therein so as to provide a desired residual compressive stress pattern after manufacture of desired holes through the workpiece.

Turning now to FIG. 11, the use of a pair of adjustable compound indenters 120 and 122 as taught herein is depicted during automated work flow for indenting the obverse side 124 of a workpiece 126 located on a platen or anvil 128. The adjustable compound indenters 120 and 124 can be actuated downward in the direction of reference arrow 130 against the workpiece 126 to provide suitable indentations 132 and 134 therein so as to provide a desired residual compressive stress pattern in the workpiece 126 along sidewalls of apertures (not shown in FIG. 11) after the manufacture of the desired holes through the workpiece 126. Importantly, the compound indenters 120 and 122 can be moved as indicated by reference arrows 136 to impact on, and release from, the obverse surface 124 of workpiece 126 by using an appropriate striking mechanism 138, which may be hydraulic, pneumatic, mechanical, electromechanical, electromagnetic, or any other appropriate striking mechanism. Alternately, or additionally, one or more indenters 120 and 122 affixed to mount 140 can be moved back and forth to and away from workpiece 126 by a ram or press actuator 142 or other suitable device as better indicated in FIG. 12.

Figure 12:
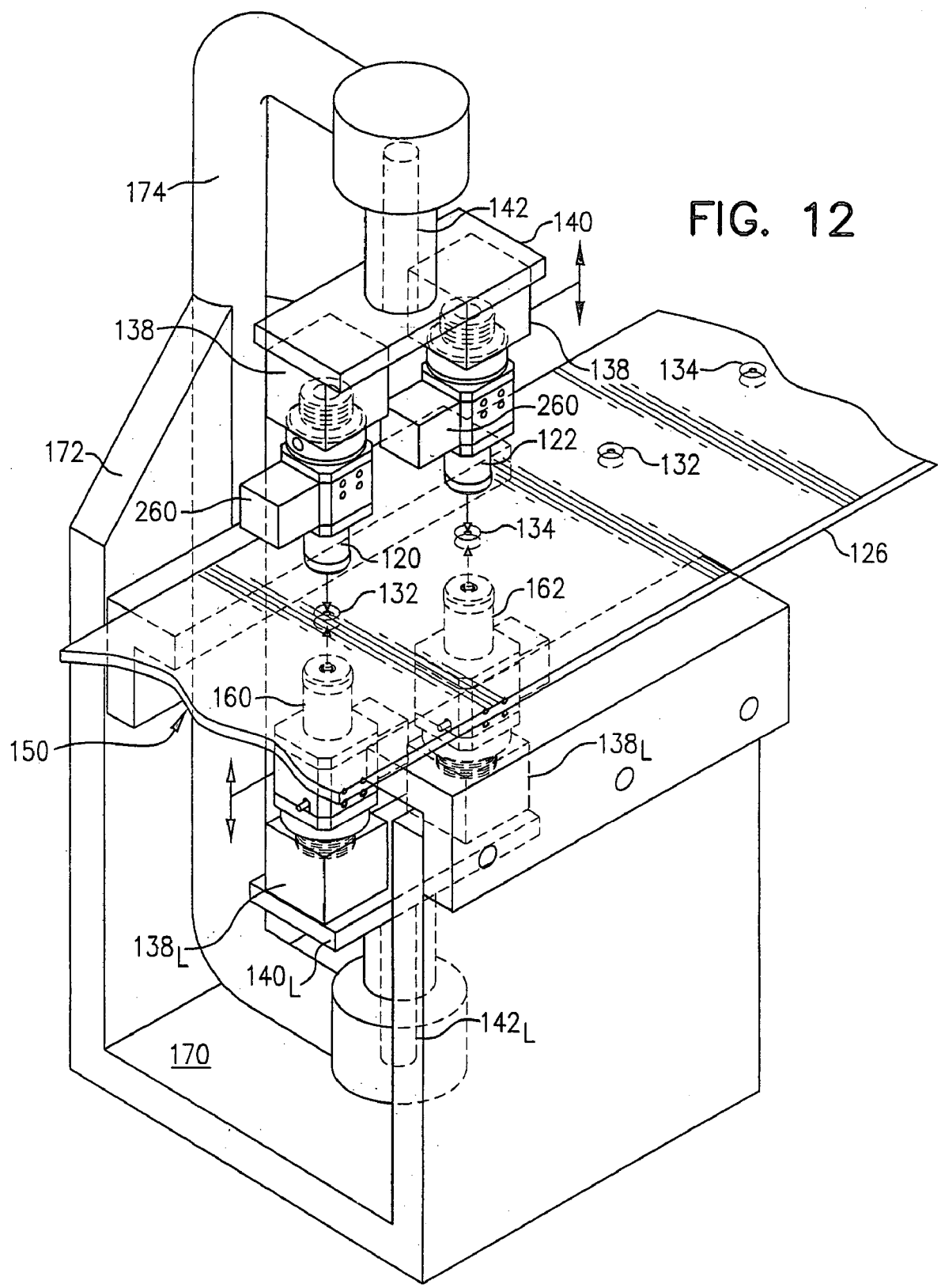
FIG. 12 shows the use of a pair of adjustable compound indenters as taught herein to indent (a) the obverse side of a workpiece, and (b) the reverse side of a workpiece, so that the adjustable compound indenters can be actuated (1) downward against a workpiece, and (2) upward against a workpiece, to provide suitable indentations therein so as to provide a desired residual compressive stress pattern after manufacture of desired holes through the workpiece.

FIG. 12 shows the use of a two pairs of adjustable compound indenters as taught herein to indent (a) the obverse side 126 of a workpiece using indenters 120 and 122, as just described in reference to FIG. 11, so that the adjustable compound indenters 120 and 122 can be actuated downward against workpiece 126, and (b) the reverse side 150 of workpiece 126, so that the second pair adjustable compound indenters 160 and 162 can be actuated upward against the reverse side 150 of workpiece 126. Lower unit striking mechanisms 138L and work as described above for upper striking mechanisms 138. Lower mount 140L and lower press ram 142L function as described above for the mount 140 and the press ram 142, respectively. Also, for automated manufacturing, it is anticipated that such an apparatus will often include a base 170 and a stand 172, often including a generally C-shaped yoke 174, all as necessary for spacing upper compound indenters 120 and 122 and/or lower compound indenters 160 and 162 at a desired distance from obverse 124 and reverse 150 sides of a workpiece 126.

Each one of the adjustable compound indenters 120, 122, 160 and 162 can be adjusted as required, both with respect to the length of primary indenters (further described below) and with respect to the amount of indentation (dimple depth "dd") achieved in the workpiece 126, so as to provide a desired residual compressive stress pattern in the workpiece 126 after manufacture of desired holes through the workpiece 126.

Figure 13:
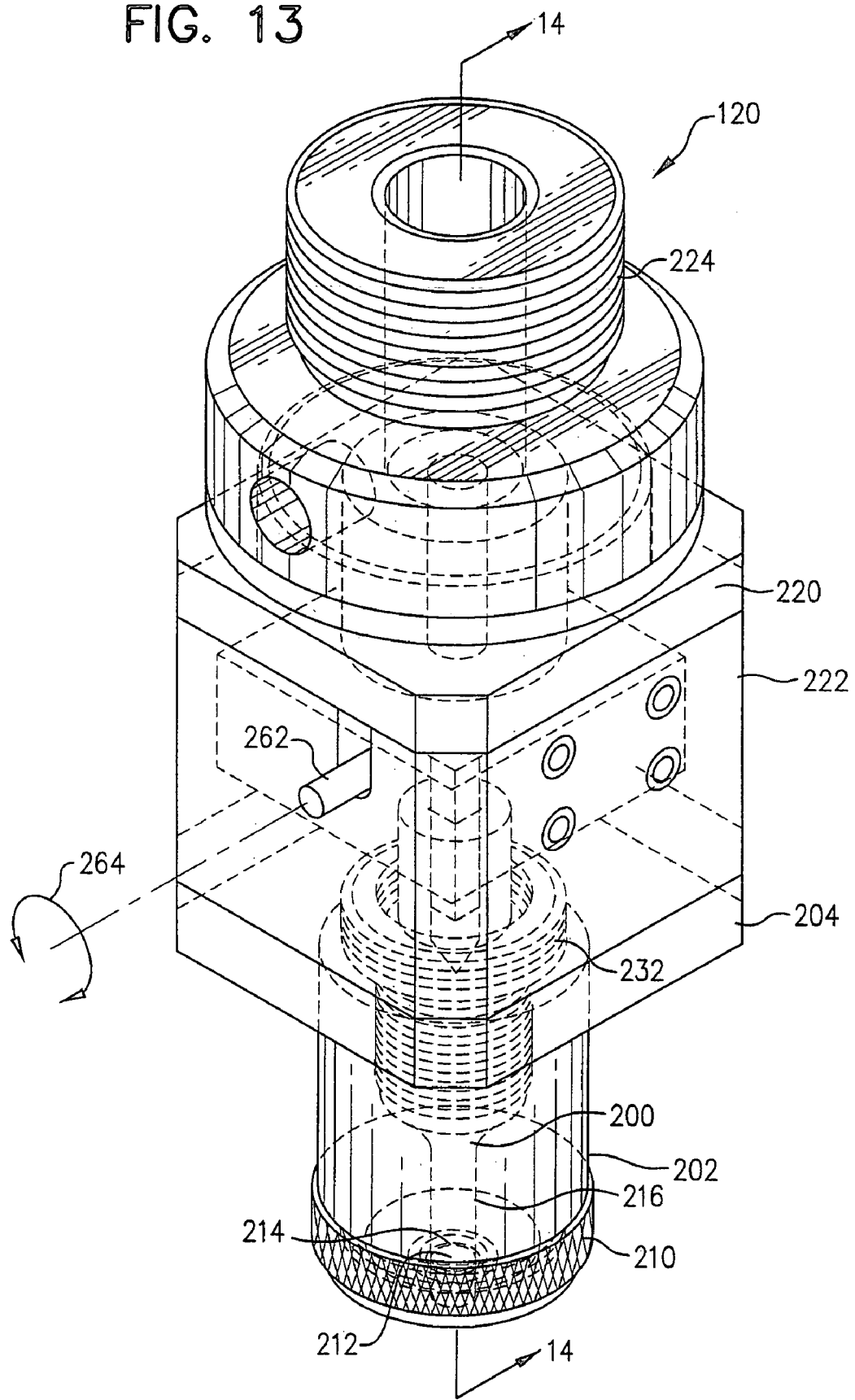
FIG. 13 is a perspective view of an embodiment of the adjustable compound indenter, showing the adjustable primary indenter, the nose cap with secondary indenter attached to the primary indenter housing, the indenter block adapter from which the primary indenter housing is supported, a bottom plate, top plate, and side plate for housing the adjustment actuator and 90 degree speed reducer for connection to a stepper or servo motor (not shown) or other suitable drive for adjustment of the length of the primary indenter, and a threaded adapter for attachment of the adjustable compound indenter to an indenter ram press drive.

Specific details of one embodiment for a desirable adjustable compound indenter 120 are illustrated in FIG. 13. An adjustable primary indenter 200 is adjustably secured in a primary indenter housing 202. The indenter housing is removeably secured from an adapter block 204. A nose cap 210 is provided at the distal end of the indenter housing, with a passageway 212 therethrough defined by sidewalls 214 that is sized and shaped for passage of the support 216 of working end 218 of adjustable primary indenter 200. A top plate 220 above sidewalls 222 of the adapter block 204 provide a suitable location for a threaded adapter 224. As better seen in FIG. 14, the primary adapter housing 202 utilizes external threads 230 for threaded engagement to the internal threads 232 in the adapter block 204. More importantly, the primary indenter 200 utilizes load receiving threads 240 for acting with respect to interior threads 242 in the indenter housing 202, for translating rotation of the primary indenter into vertical motion, to change the primary indenter 200 protruding length X between a first length $X_1$ and a second length $X_2$, with respect to the foot face portion 246 of nose cap 210.

The primary indenter 200 further includes a driver receiver 250 for receiving the drive end 252 of a drive pin 254. The drive pen 254 is drive pin is driven via a 90 degree worm type gear 258 or other suitable speed reducer for connection to a stepper motor 260 (not shown, but see FIG. 11 or FIG. 12) or other suitable drive for adjustment of the length X of the primary indenter 200. I have found that the necessary drive mechanism 258 is easily accomplished by use of speed reducer drive catalogue number 2Z18-E0200, from Stock Drive Products, Inc. of 2101 Jericho Turnpike, Box 5416, New Hyde Park, N.Y. 11042-5416. This device provides input to rotating shaft 262 that is acted upon by the aforementioned stepper motor for turning as indicated by reference arrow 264.

Figure 14:
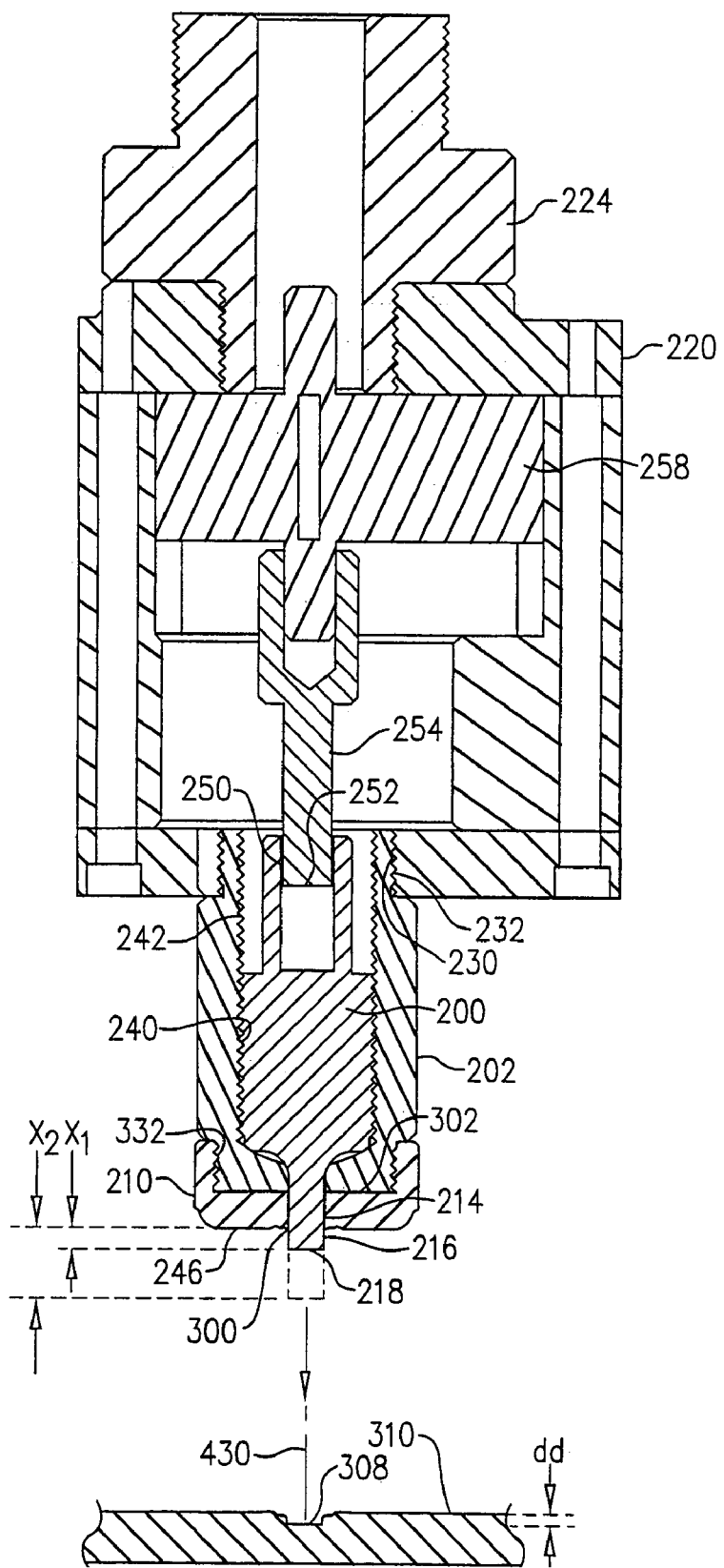
FIG. 14 is a vertical cross sectional view of the adjustable compound indenter first illustrated in FIG. 13, additionally showing certain internal components, including a drive pin and 90 degree speed reducer for connection to a stepper motor (not shown) or other suitable drive for turning the primary indenter in its threads to achieve vertical adjustment of the length of the primary indenter, as well as showing the nose cap with integral secondary indenter which is attached to the primary indenter housing, and the indenter block adapter from which the primary indenter housing is supported, and a bottom plate, top plate, and side plate for housing the adjustment actuator and 90 degree speed reducer, and a threaded adapter for attachment of the adjustable compound indenter to an indenter ram press drive, as well as illustrating the impact of such an adjustable compound indenter against a workpiece therebelow.

In FIG. 14, a vertical cross sectional view of the adjustable compound indenter 120 just illustrated in FIG. 13, shown, additionally and more clearly showing certain internal components, including drive pin 250 and the 90 degree angle speed reducer 258 for connection to a stepper or other drive motor 260 suitable drive for turning the primary indenter 200 to rotate in threads 242 of the primary indenter housing 202 to achieve vertical adjustment of the length X of the primary indenter 200. Also, note further details of the nose cap 210 with integral secondary indenter 300 (better seen in FIG. 18 below) which is attached to the distal end 302 of the primary indenter housing 202. Also illustrated is the working end 218 primary indenter 200 that has indented a dimple 308 in a workpiece 310 to a dimple depth of "dd". It has been observed that for like materials and for like treatment, the dimple depths required are consistent. Thus, this provides for the use of dimple depths as a quality control measure for the process, and thus as a measure of effectiveness of the method.

Figure 15:
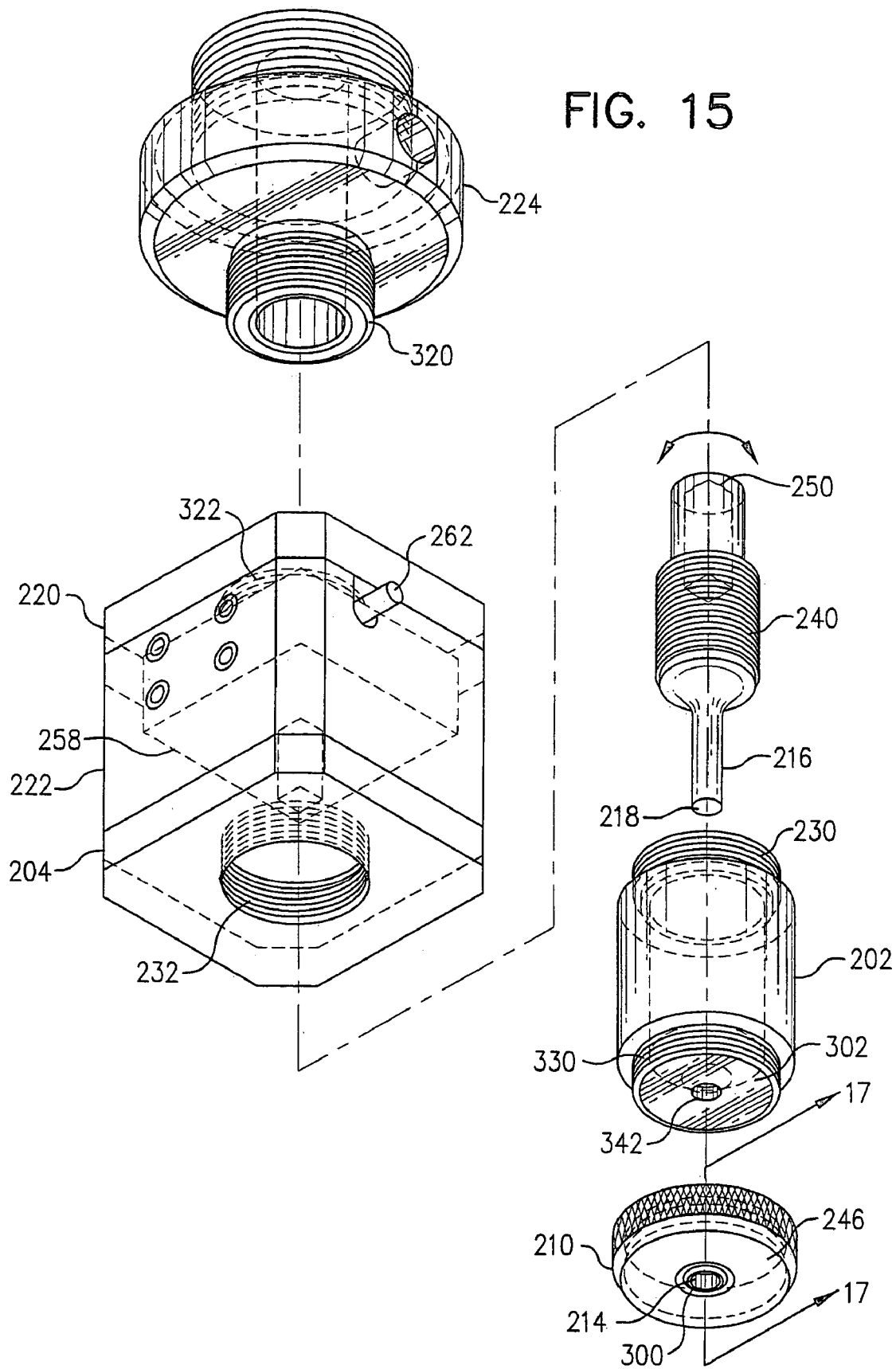
FIG. 15 is an exploded perspective view of the adjustable compound indenter just illustrated in FIGS. 13 and 14, now additionally showing certain internal components, threads for attachment of the threaded adapter to the top plate, threads for threaded attachment of the primary indenter housing to the bottom plate, threads for threaded attachment of the nose cap with integral secondary indenter to the primary indenter housing, and external threads on the primary actuator for threaded engagement with internal threads (see FIG. 14) in the primary indenter housing, vertical adjustment of the primary indenter with respect to the secondary indenter in this adjustable compound indenter.

FIG. 15 is an exploded perspective view of the adjustable compound indenter 120 illustrated in FIGS. 13 and 14, now additionally showing certain internal components, including threads 320 on threaded adapter 224 for attachment to the threaded receiver 322 in top plate 220, and external threads 330 on the primary indenter housing 202 for receiving internal threads 332 (see FIG. 14) in the nose cap 210, for threaded attachment of the nose cap 210 to the to the primary indenter housing 202. Also shown is the knurled surface 340 of nose cap 210, suitable for manually affixing nose cap 210 to the primary indenter housing 202. Additionally, not the passageway defined by edgewall 342 for tightly receiving therethrough the support shaft 216 of the primary indenter 200.

Figure 16:
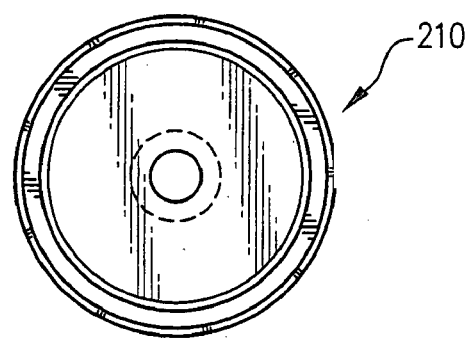
FIG. 16 is a top view taken looking down at the inside of the nose cap with integral secondary indenter, as if through line 16-16 in FIG. 17.

For a complete understanding of the invention, attention is directed to FIGS. 16, 17, and 18, each of which shows important details of the nose piece or nose cap 210. In FIG. 16, a bottom view of the nose cap 210 is provided, taken looking up at the nose cap 210 shown in FIG. 17. As illustrated, the nose cap 210 includes an integral secondary indenter 300, which is substantially in the form of a flat, annular contacting ring. As shown, the secondary indenter 300 is of narrow radial width of approximately 0.003 inches (0.076 mm). Radially outward from the secondary indenter 300, the contour of the nose piece 210 includes a contour 360 having a first blend angle bend of approximately 135° with a 0.01 inch (0.25 mm) radius. Then, the contour of the nose piece 210 includes a tertiary indenter 400 having an outside radius of 0.029 inches (0.74 mm). Next, the contour of the nose cap 210 includes a second blend radius 402, radially outward from the tertiary indenter 400, having a second blend angle bend of approximately 133° with a 0.01 inch (0.25 mm) radius. Next, the nose cap 210 includes a concave portion 410 before flat portion 246 of foot 412 is completed. Importantly, the nose piece 210 has a contour, in the radially outward direction, which includes a foot 412 having an concave annular portion 410 radially outward from a last, here second 402, blend radius. As illustrated, for work on aluminum for many common fastener sizes, it has been found that best results are achieved by locating the concavity 402 at a location approximately 0.05 inches (1.27 mm) radially outward from the edge wall 422 of a cylindrical slot for receiving said primary indenter, and to define the concavity by removing material with an angle of approximately five (5) degrees with respect to the flat surface 246 of foot 412. For most applications, it is appropriate that the flat portion 246 of foot 412 be oriented transverse to the axis of indentation (see reference numeral 430 in FIG. 14) in workpiece 310.

Details of the primary indenter 200 as set forth in FIG. 19 have been previously discussed. However, this figure more clearly shows drive receiver 250 of depth of about 0.75 inches (19.05 mm) for receiving the drive end 252 of drive pin 254. Also shown in better detail is the peripheral wall angle beta ($\beta$) of about five degrees, more or less, which enables cleaner indentation to and withdrawal from a workpiece.

Importantly, the supporting shaft 216 and end 218 of the primary indenter 200, as well as the various components just described on the nose cap 210, are provided with a durable low friction coating. Thus, both the primary indenters, the secondary indenter, and any tertiary indenters, ideally include such a durable low friction coating. A suitable durable low friction coating includes a coating of chromium nitride. Better yet, such a coating also includes tungsten disulfide. Such coatings, although relatively thin, have a thickness from 0.0002 inches (0.005 mm) to about 0.0003 inches (0.008 mm). These low friction coatings reduces friction and shearing at the edge of the dimple, and allows better radial flow of metal, which in turn provides greater residual stress, thus better achieving the ultimate objective, greater fatigue life improvement. Also, such coatings also reduce stripping force as the primary 200 and secondary 300 indenters are removed, as well as minimize metal pickup on the indenter surface.

The use of the compound indenters in manufacturing of thick stacks of material is further shown by FIGS. 20, 21, 22, 23, and 24. FIG. 20 illustrates the use of opposing, integral, one-piece compound indenters on a thick stack, to create desirable residual stresses in both the first side of an upper workpiece and in the second side of a lower workpiece, so that desirable compressive stress is created throughout the thick stack. With respect to FIGS. 20 and 21, it should be noted that the anticipated actual aperture hole edge location 480 may be located radially inward of, or radially outward of, the peripheral edge 502 of the indenter 503 or peripheral edge 504 of indenter 506. The choice of wall location is dependent on various factors, most importantly of course the amount of beneficial residual stress present, after treatment, at the pre-selected wall location.

Figure 21:
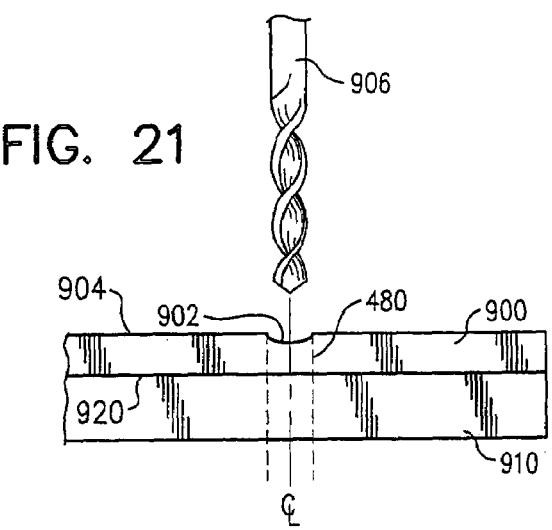
FIG. 21 shows the step of drilling or reaming a hole in one or more workpieces, here showing a first workpiece where a dimple has been formed by action of a compound indenter as taught herein, and a second workpiece wherein the step of indenting the metal to improve fatigue life as taught herein has not been utilized.

Another feature of the method of the present invention is the use of wet sealant, or bonding agent between a first and second workpiece, such sealant 920 between workpiece 900 and 910 illustrated in FIG. 21. This is important in the manufacture of aircraft for corrosion resistance and wet wing construction using polysulfide type sealants or other materials.

Figure 22:
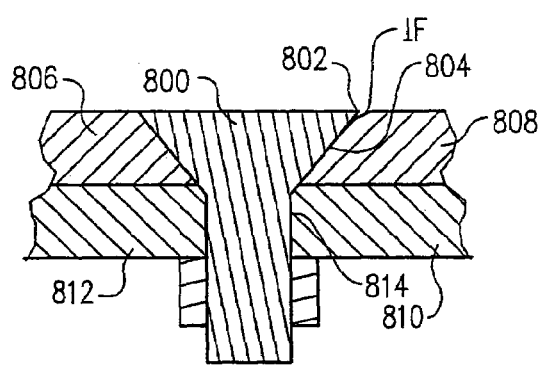
FIG. 22 illustrates the use of a flush rivet with a shank portion to join a first workpiece having a chamfered hole edge therein to accommodate the flush rivet head, and a second workpiece having a straight or transverse hole edgewall therethrough for accommodating the shank of the rivet.
Figure 23:
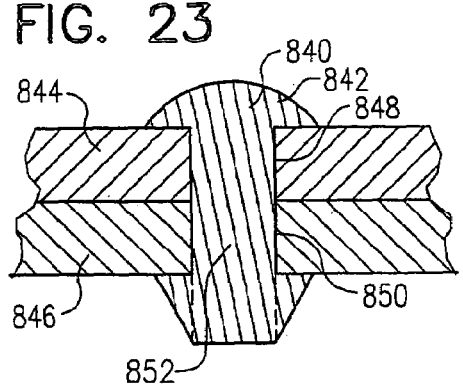
FIG. 23 illustrates the use of rivet having a round head to join a first workpiece having a straight or transverse hole edgewall therethrough, and a second workpiece also having a straight or transverse hole edgewall therethrough.

FIG. 22 illustrates the use of a flush rivet with a shank portion to join a first workpiece having a chamfered hole edge therein to accommodate the flush rivet head, and a second workpiece having a straight or transverse hole edgewall therethrough for accommodating the shank of the rivet. FIG. 23 illustrates the use of rivet having a round head to join a first workpiece having a straight or transverse hole edgewall therethrough, and a second workpiece also having a straight or transverse hole edgewall therethrough. In FIG. 22, the peripheral edge 802 of a fastener 800, is shown with a small indentation IF adjacent thereto. FIG. 22 is particularly interesting since it provides an indication that a countersunk type outer edge wall 804 can be prepared according to the methods described herein to provide a desirable beneficial residual stress pattern in the body 806 of structure 808. Likewise, the body 810 of structure 812 adjacent to the more conventional perpendicular edge wall 814 can be treated to provide a desirable beneficial stress pattern in the body 810. More conventionally, as shown in FIG. 23, a fastener 840 having an externally protruding head 842 is provided to join structural members 844 and 846. In such structures, apertures defined by sidewalls 848 and 850, respectively, accommodate the fastener shank 852. The beneficial residual stress is advantageously provided in both structural member 844 and in member 846.

Although it is generally expected that most structures would substantially benefit from increased fatigue resistance being imparted from both the obverse and the reverse sides of the structure. However, in some applications, there may arise useful results when only a single side is treated. Such one-sided treatment of a structure is depicted in FIG. 21. Here, a first workpiece 900 has been dimpled 902 in a single, obverse side 904 according to the method taught herein. Preferably, a tapered drill 906 is utilized to drill the desired aperture, through workpiece 900, as well as through matching workpiece 910 in which no cold working for stress relieve has been achieved. Alternately, in FIG. 20, single side working of two workpieces in a stack is depicted. Indenters 503 and 506 are used to provide beneficial residual stress near the desired locations for fastener apertures in the finished structure fabricated from the workpiece 532 and 534.

Figure 24:
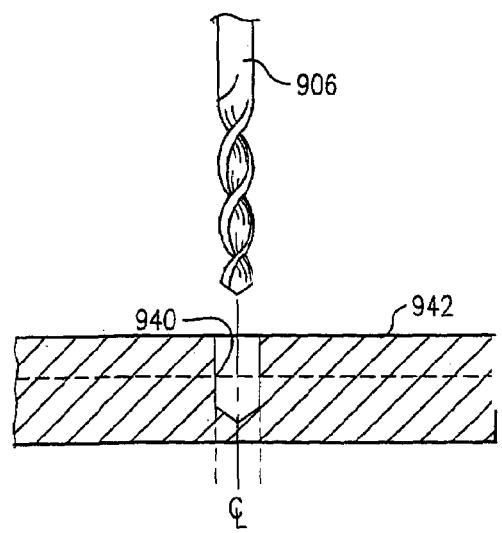
FIG. 24 illustrates the step of drilling or reaming a blind hole or dead end passage in a thick workpiece, wherein the workpiece has been treated by that has been formed by action of a compound indenter as taught herein.

FIG. 24 illustrate the use of a tapered drill 906 for drilling a blind hold defined by edgewall 940 in thick workpiece 942.

Further, it is also important to understand that unusual configuration, non-circular type apertures can be treated with the method described herein, to provide beneficial residual stress levels at desired locations bounding locations adjacent the interior edge wall of through passageways in structures. Thus, structures having non-circular holes therein can advantageously be treated with this method to provide beneficial residual stress levels at desired locations in the structure.

It is to be appreciated that the novel compound indenter, and the process of utilizing such compound indenter in thick materials or deep stack workpieces, to reduce fatigue stress degradation of such parts, is an appreciable improvement in the state of the art of cold working metal parts subject to fatigue concerns. Importantly, this compound indenter and the method of employing the same can advantageously treat a hole before it is machined. Thus, the tooling apparatus and the method of its use disclosed herein provide substantial improvement over currently used treatment methods by eliminating various tooling and tooling aids, such as expansion mandrels, sleeves, and hole lubricants.

In this improved method, control of the magnitude and depth of residual stress is determined by the properties and characteristics of a particular workpiece, nature of the force or displacement imparted on the workpiece, as particularly and effectively accomplished via advantageous use of appropriately dimensioned and designed compound indenters. Importantly, the use of a compound indenter in manufacturing process as disclosed herein are readily automated and can be put into any automated fastening environment. Although only a few exemplary embodiments of this invention have been described in detail, it will be readily apparent to those skilled in the art that our novel methods for cold working metal, and the tooling and other apparatus for advantageously implementing such processes, may be modified from those embodiments provided herein, without materially departing from the novel teachings and advantages provided herein, and may be embodied in other specific forms without departing from the spirit or essential characteristics thereof. Therefore, the embodiments presented herein are to be considered in all respects as illustrative and not restrictive. As such, the disclosure and the claims are intended to cover the structures described herein and not only structural equivalents thereof, but also equivalent structures. Thus, the scope of the invention is intended to include all variations described herein, whether in the specification or in the drawing, including the broad meaning and range properly afforded to the language and description set forth herein to describe such variations. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed. Alternative features serving the same or similar purpose may replace each feature disclosed in this specification (including any accompanying claims, the various figures of the drawing), unless expressly stated otherwise. Thus, each feature disclosed is only one example of a generic series of equivalent or similar features. Further, while certain materials are described for the purpose of enabling the reader to make and use certain embodiments shown, such suggestions shall not serve in any way to limit the claims to the materials disclosed, and it is to be understood that other materials, including other metals and various compositions, may be utilized in the practice of our methods, and in the manufacture of structures utilizing the apparatus and methods disclosed herein.

The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

The invention claimed is:

1. A method for working a bounding portion of material in a structure, said bounding portion adjacent a pre-selected location for an opening through said structure, in order to provide residual compressive stresses in said bounding portion for improving the fatigue life of said structure, said method comprising:

providing a first compound indenter, said first compound indenter comprising a first indenter surface portion, said first indenter surface portion adapted to impact said structure at pre-selected surface locations adjacent said pre-selected location for said opening through said structure, and a second indenter surface portion, said second indenter surface portion adapted to impact said structure at pre-selected surface locations adjacent said pre-selected location for said opening through said structure;

said first indenter surface portion spaced apart from said second indenter surface portion; and indenting said pre-selected surface location of said structure with said first compound indenter to provide said residual compressive stresses in bounding portion of material.

2. The method as set forth in claim 1, further comprising removal of a selected portion of material from said structure, said selected portion of material removed from said structure having an outer border portion, said outer border portion located at or adjacent to said pre-selected surface location on said structure having been impacted by said first indenter surface portion and said second indenter surface portion of said first compound indenter, so that said bounding portion of material expands transversely to said outer border portion of said selected portion of material removed from said structure.

3. A method for working a bounding portion of material in a structure, said bounding portion adjacent a pre-selected location for an opening through said structure, in order to provide residual compressive stresses in said bounding portion for improving the fatigue life of said structure, said method comprising:
providing a first compound indenter, said first compound indenter comprising:
a first indenter surface portion, said first indenter surface portion adapted to deform said structure at pre-selected surface locations adjacent said pre-selected location for said opening through said structure, and
a second indenter surface portion, said second indenter surface portion adapted to deform said structure at pre-selected surface locations adjacent said pre-selected location for said opening through said structure;
said first indenter surface portion spaced apart from said second indenter surface portion; and
deforming said pre-selected surface location of said structure with said first compound indenter to provide residual stress in said bounding portion of material, wherein said bounding portion is adjacent to said pre-selected location for said opening through said structure.

4. The method as set forth in claim 3, further comprising removal of a selected portion of material from said structure, said selected portion of material removed from said structure having an outer border portion, said outer border portion located at or adjacent to said pre-selected surface location on said structure having been deformed by said first indenter surface portion and said second indenter surface portion of said first compound indenter, so that said bounding portion of material expands transversely to said outer border portion of said selected portion of material removed from said structure.

5. The method as set forth in claim 1 or claim 3, wherein said first compound indenter comprises a dynamic indenter.

6. The method as set forth in claim 2 or claim 4, wherein removal of said selected portion of material from said structure defines an elongated recessed portion.

7. The method as set forth in claim 6, wherein said elongated recessed portion comprises a closed end portion.

8. The method as set forth in claim 2 or claim 4, wherein removal of said selected portion of material from said structure defines a through passageway.

9. A method of manufacturing a joint which includes overlapping at least first and second structural members, said method comprising:
(a) contacting a preselected portion of said first structural member with a first compound indenter at a pressure greater than the yield point of the composition of said structural member to deform a portion of said first structural member in a manner so as to impart a pre-selected residual stress at a location at or near a selected location for a first fastener aperture through said first structural member, and wherein said residual compressive force is substantially uniform along the entire length of sidewall portions of said first fastener aperture;
(b) machining said first structural member to define said first fastener aperture via sidewall portions resulting from said machining;
(c) providing in said second structural member, a second fastener aperture defined by second sidewall portion;
(d) inserting a fastener through said first and said second fastener apertures;
(e) securing said fastener.

10. The method of claim 9, further comprising the step of applying force or displacement to said fastener to seat said fastener within said first and said second fastener apertures.

11. The method of claim 10, wherein the step of seating said fastener further comprises deforming an end portion of said fastener in order to secure and retain said fastener against said first structural member.

12. The method as set forth in claim 9, wherein the depth of indentation on the obverse and the reverse side is different.

13. The method as set forth in claim 9, further comprising, post indentation, the step of drilling a hole into or through said workpiece.

14. The method as set forth in claim 13, wherein said step of drilling comprises a drilling step selected to provide a finished hole selected from the group consisting of (a) straight through hole, (b) stepped hole, (c) a blind hole, (d) a countersink hole, (e) a non-round or non-circular hole.

15. The method as set forth in claim 14, further comprising the step of threading the hole.

16. The method as set forth in claim 9, further comprising
(a) contacting a preselected portion of said second structural member with a first compound indenter at a pressure greater than the yield point of the composition of said second structural member to deform a portion of said second structural member in a manner so as to impart a pre-selected residual stress at a location at or near a selected location for said second fastener aperture through said second structural member, and wherein said residual compressive force is substantially uniform along the entire length of sidewall portions of said second fastener aperture.

17. The method as set forth in claim 13, wherein said step of drilling comprises a drilling step selected to provide a finished hole selected from the group consisting of (a) straight through hole, (b) stepped hole, (c) a blind hole, (d) a countersink hole, and (e) a non-round or non-circular hole.

18. A method for manufacturing a workpiece for having an enhanced fatigue life structure, said workpiece having a first surface, a second surface, a thickness of material therebetween, and at least a first pre-selected location at which a hole having an edge location is to be fabricated in said workpiece, said method comprising:
(a) securing said workpiece at a first working location, said first working location suitable for press forming work on said workpiece;
(b) deforming a pre-selected location on said workpiece by indenting said workpiece at said pre-selected location with a compound indenter having a first indenter surface portion and a second indenter surface portion, said first indenter surface portion spaced apart from said second indenter surface portion. to create residual compressive stresses through said thickness of said material of said workpiece along said hole edge location; and
(c) machining an aperture in said workpiece to provide said hole in said workpiece.

19. The method of claim 18, wherein the deformation of said workpiece results in a residual compressive stress along said hole edge location through said material thickness of said workpiece, from said first surface of said workpiece to said second surface of said workpiece.

20. The method of claim 18, further comprising the steps of:
   (a) determining desired application of stress and strain in said workpiece during said indentation step, by using finite-element analysis of the workpiece and the relationship of residual stress as a function of the material of the workpiece as well as of the applied force and indenter shape; and
   (b) selecting an appropriate indenter shape and applied force to form the workpiece while avoiding surface upset on the workpiece.

21. The method as set forth in claim 1, or in claim 3, or in claim 9, or in claim 18, wherein said first compound indenter further comprises a first foot portion.

22. The method as set forth in claim 21, wherein said first foot portion applies a load to said workpiece sufficient to substantially avoid surface upset in said workpiece.

23. The method as set forth in claim 22, wherein said load applied to said workpiece is applied prior to impacting or deforming said workpiece.

24. The method of claim 18, wherein said method of manufacturing involves advancing said workpiece incrementally in a machine to position said workpiece to the repetitive action of one or more selected compound indenters, to thereby create desirable residual compressive stress at a plurality of pre-selected locations, and machining an aperture at a plurality of said pre-selected locations, so as to provide a plurality of holes in said workpiece each having improved fatigue life by virtue of having residual compressive stress along at least a portion of an edge wall of said hole.

25. The method as set forth in claim 24, wherein said residual compressive stress is provided along the entire hole edge wall throughout the thickness of said workpiece between said first surface and said second surface.

26. A joint comprising:
   (a) a stack of structural members including:
      (1) a first member having a body made of material having a bounding portion of material substantially perpendicular to a first fastener aperture in which the first fastener aperture defined by a first edge wall portion is conditioned by the method of claim 1, or of claim 3, or of claim 18, wherein said bounding portion of the material provides a residual, radially inward, substantially uniform compressive stress to the first edge wall portion, and
      (2) a second member having a second fastener aperture defined by a second edge wall portion, said second fastener aperture aligned with said first fastener aperture; and
   (b) an interference fit fastener including a shank portion, said shank portion located adjacent said first fastener aperture and adjacent said second fastener aperture, and wherein said first fastener aperture provides residual compressive stresses around said shank.

27. A method for manufacturing a workpiece for having an enhanced fatigue life structure, said workpiece of the type having a first surface, a second surface, a thickness of material therebetween, and at least a first pre-selected location at which a hole having an edge location is to be fabricated in said workpiece, said method comprising:
   (a) securing said workpiece at a first working location, said first working location suitable for press forming work on said workpiece; (b) deforming a preselected location on said workpiece by indenting said workpiece at said preselected location with a compound indenter defined by a first indenter surface portion spaced apart from a second indenter surface portion, to create residual compressive stresses through said thickness of said material of said workpiece along said desired hole edge location;
   (c) machining an aperture in said workpiece to provide said hole in said workpiece;
   (d) wherein the deformation of said workpiece results in a predetermined zero hoop stress profile, after reaming, substantially as set forth in FIG. 10.

28. A method for making a thick metal part in which holes are to be fabricated at predetermined locations, said part having first and second surfaces and a thickness of material therebetween, said method comprising the steps of:
   (a) providing a thick metal plate
   (b) applying a controlled strain and/or stress rate at at least one of said predetermined locations at which holes are to be formed, by indenting said part with a compound indenter, said indenter of the type having a primary indenter, a secondary indenter, a tertiary indenter, and a foot, by actuating a ram against said first surface of said part; and
   (c) machining the indented part to remove material to shape a hole and thus convert the thick metal plate into a finished part.
   (d) wherein the manufacture forming greatly reduces the handling necessary by allowing said hole to be fabricated by a single drilling operation to provide a hole in a desired configuration in the finished part.

29. The method of claim 28, wherein forming occurs with the zero hoop stress relationship as a function of dimple depth substantially as set forth in FIG. 10.

30. The method as set forth in claim 28, wherein said foot applies a load to said workpiece sufficient to substantially avoid surface upset in said workpiece.

31. A joint comprising:
   (a) a stack of structural members including:
      (1) a first member having a body made of material in which a first fastener aperture defined by a first edge wall portion is conditioned by the method of claim 9, or of claim 28 to have a residual, radially inward compressive stress adjacent the first edge wall portion, and wherein said first member has a first surface which is substantially perpendicular to said first edge wall portion of said first fastener aperture;
      (2) a second member having a second fastener aperture defined by a second edge wall portion, said second fastener aperture aligned with said first fastener aperture; and
   (b) an interference fit fastener including a shank portion, said shank portion located adjacent said first fastener aperture and adjacent said second fastener aperture, and wherein said first fastener aperture provides residual compressive stresses around said shank.

32. The joint as set forth in claim 31, wherein said second edge wall portion in said second member is conditioned to have radially inward compressive residual stress.

33. The joint as set forth in claim 31, wherein said interference fit fastener comprises a flush type rivet further comprising a countersunk portion, and wherein said residual compressive stress is applied through said body of said first member along said countersunk portion of said rivet.

34. The joint as set forth in claim 33, wherein said interference fit fastener comprises a rivet having a straight shank portion, and wherein said residual compressive stress is applied substantially uniformly through said body of said first member along said first edge wall portion.

35. A joint comprising:
(a) a stack of structural members comprising
  (1) a first member having a body made of material in which a first fastener aperture defined by a first edge wall portion is conditioned by the method of claim 1, or of claim 3, or of claim 9, or of claim 18, or of claim 28, to have a residual, radially inward compressive stress, and wherein said first member has a first surface which is substantially perpendicular to said first edge wall portion of said first fastener aperture;
  (2) a second member having a second fastener aperture defined by a second edge wall portion, said second fastener aperture aligned with said first fastener aperture; and
(b) one or more fasteners, said one or more fasteners securely affixing said first member to said second member.

36. The joint as set forth in claim 34, wherein said second edge wall portion in said second member is conditioned to have radially inward compressive residual stress.

37. The joint as set forth in claim 31, wherein said joint further comprises, between said first and said second members, a sealing compound.

38. The joint as set forth in claim 31, wherein said joint further comprises, between said first and said second members, a cured sealant.

39. The joint as set forth in claim 31, wherein said joint further comprises, between said first and said second members, a bonding compound.

40. The joint as set forth in claim 31, wherein said joint comprises two members.

41. The joint as set forth in claim 31, said joint comprises at least three members.

42. A metal plate structure that is manufactured for enhanced fatigue life, said structure having a first surface, a second surface, a thickness of material therebetween, and at least a first preselected location at which a hole having an edge location is to be fabricated, said metal plate structure having a bounding area adjacent said edge location, said metal plate structure manufactured using a method comprising:
(a) securing said metal plate structure at a first working location, said first working location suitable for press forming work on said metal plate structure;
(b) indenting a pre-selected location on said metal plate structure by indenting said metal plate structure at said preselected location with a compound indenter, in said bounding area a substantially uniform residual compressive stresses through said thickness of said material of said metal plate structure along said hole edge location;
(c) machining an aperture in said metal plate structure to provide said hole in said metal plate structure; and
(d) wherein said metal plate structure has a first surface which is substantially perpendicular to said hole edge location.

43. The metal plate structure as set forth in claim 42, wherein said metal plate structure is manufactured by a method wherein said deformation of said metal plate structure in a predetermined zero hoop stress profile, after reaming, substantially as set forth in FIG. 10.

44. The metal plate structure as set forth in claim 42, wherein said metal plate structure is manufactured by a method wherein said deformation of said metal plate structure results in a residual compressive stress along said hole edge location through said material thickness of said metal plate structure, from a first surface of said metal plate structure to a second surface of said metal plate structure.

45. An article of manufacture comprising:
a finished metal part, said finished metal part comprising a metal plate having first and second surfaces and a thickness of material therebetween, said metal plate having predetermined locations at which holes are fabricated therein, said metal part comprising material bounding the predetermined locations, wherein said material bounding the predetermined locations provides a radially inward compressive stress toward the predetermined locations, said metal plate manufactured according to a method comprising the steps of:
(a) providing the metal plate;
(b) applying a controlled strain and/or stress rate at, at least one of said predetermined locations at which holes are to be formed, by indenting said metal plate with a compound indenter, said indenter of the type having a primary indenter, a secondary indenter, a tertiary indenter, and a foot, by actuating a ram against said first surface of said metal plate;
(c) machining the indented metal plate to remove material to shape a hole having an edge wall portion, and thus convert the metal plate into a finished metal part; and
(d) wherein said holes are fabricated by a single drilling operation to provide a hole in a desired configuration in said finished metal part, and
(e) wherein said first surface is substantially perpendicular to said edge wall portion.

46. The part of claim 45 wherein the finished metal part comprises aluminum.

47. A method of manufacturing a joint which includes overlapping at least first and second structural members, said method comprising:
(a) contacting a pre-selected portion of said first structural member with a first compound indenter at a pressure greater than the yield point of the composition of said first structural member to deform a portion of said first structural member in a manner so as to impart a pre-selected residual compressive stress at a location at or near a selected location for a first fastener aperture through said first structural member, and wherein said pre-selected residual compressive stress is substantially uniform along the entire length of sidewall portions of said first fastener aperture;
(b) machining said first structural member to define said first fastener aperture via sidewall portions resulting from said machining;
(c) providing in said second structural member, a second fastener aperture defined by second sidewall portion;
(d) inserting a fastener through said first and said second fastener apertures; and
(e) securing said fastener to said first and to said second structural members, to for a workpiece comprising a secure, fastened joint between said overlapping first and second structural members.

48. The method as set forth in claim 47, wherein said first structural member comprises a first obverse side, and wherein said second structural member comprises a first reverse side, and further wherein the depth of indentation on the obverse side and the depth of an indentation on the first reverse side is different.

49. The method as set forth in claim 47, further comprising, contacting a pre-selected portion of said second structural member with a first compound indenter at a pressure greater than the yield point of the composition of said second structural member to deform a portion of said second structural member in a manner so as to impart a pre-selected residual compressive stress at a location at or near a selected location for said second fastener aperture through said second structural member, and wherein said pre-selected residual compressive stress is substantially uniform along the entire length of sidewall portions of said second fastener aperture.

50. A method for making a thick metal part in which holes are to be fabricated at predetermined locations, said part having first and second surfaces and a thickness of material therebetween, said method comprising the steps of:
(a) providing a thick metal plate;
(b) applying a controlled strain and/or stress rate at, at least one of, said predetermined locations at which holes are to be formed, by indenting said part with a compound indenter, said indenter of the type having a primary indenter, a secondary indenter, a tertiary indenter, and a foot, by actuating a ram against said first surface of said part;
(c) machining the indented part to remove material to shape a hole and thus convert the thick metal plate into a finished part; and
(d) wherein the manufacture forming greatly reduces the handling necessary by allowing said hole to be fabricated by a single drilling operation to provide a hole in a desired configuration in the finished part.

51. The method as set forth in claim 50, wherein said foot applies a load to said part sufficient to substantially avoid surface upset in said part.

* * * * *